US012624164B2

United States Patent

(12) United States Patent
Brush et al.

(10) Patent No.: US 12,624,164 B2
(45) Date of Patent: May 12, 2026

(54) SYNTHETIC THICKENERS INCORPORATING NON-REACTIVE DILUENTS

(71) Applicant: HERCULES LLC, Wilmington, DE (US)

(72) Inventors: Kelly Anne Brush, Newark, DE (US); Venkataram Krishnan, Avondale, PA (US); Zeena Kottukapally Cherian, Exton, PA (US); Sowmitri Tarimala, Newark, DE (US)

(73) Assignee: Hercules LLC, Wilmington, DE (US)

( * ) Notice: Subject to any disclaimer, the term of this patent is extended or adjusted under 35 U.S.C. 154(b) by 1124 days.

(21) Appl. No.: 17/632,204

(22) PCT Filed: Jul. 31, 2020

(86) PCT No.: PCT/US2020/044484

§ 371 (c)(1),
(2) Date: Feb. 1, 2022

(87) PCT Pub. No.: WO2021/022153

PCT Pub. Date: Feb. 4, 2021

(65) Prior Publication Data

US 2022/0289908 A1 Sep. 15, 2022

Related U.S. Application Data

(60) Provisional application No. 62/881,621, filed on Aug. 1, 2019, provisional application No. 62/881,521, filed on Aug. 1, 2019.

(51) Int. Cl.

| | |
|---|---|
| ***C08G 65/338*** | (2006.01) |
| ***C08G 18/32*** | (2006.01) |
| ***C08G 18/50*** | (2006.01) |
| ***C08G 18/66*** | (2006.01) |
| ***C08G 18/73*** | (2006.01) |
| ***C08G 65/08*** | (2006.01) |
| ***C09D 5/02*** | (2006.01) |
| ***C09D 7/65*** | (2018.01) |
| ***C09D 133/04*** | (2006.01) |

(52) U.S. Cl.

CPC ......... *C08G 65/338* (2013.01); *C08G 18/324* (2013.01); *C08G 18/5072* (2013.01); *C08G 18/6685* (2013.01); *C08G 18/73* (2013.01); *C08G 65/08* (2013.01); *C09D 5/022* (2013.01); *C09D 7/65* (2018.01); *C09D 133/04* (2013.01)

(58) Field of Classification Search

CPC ................ C08G 65/338; C08G 18/324; C08G 18/5072; C08G 18/6685; C08G 18/73; C08G 65/08; C08G 65/26; C09D 5/022; C09D 7/65; C09D 133/04; C09D 7/43; C09D 5/024

See application file for complete search history.

(56) References Cited

U.S. PATENT DOCUMENTS

| | | | | |
|---|---|---|---|---|
| 133,147 | A | 11/1872 | Fisher | |
| 2,588,771 | A | 3/1952 | Schwartz | |
| 2,824,850 | A | 2/1958 | Widmer et al. | |
| 2,921,037 | A | 1/1960 | Andres et al. | |
| 3,016,362 | A | 1/1962 | Wismer | |
| 3,959,391 | A | 5/1976 | Allain | |
| 5,098,966 | A | 3/1992 | Ten et al. | |
| 5,574,127 | A * | 11/1996 | Sau | C08G 65/332 528/125 |
| 5,614,604 | A | 3/1997 | Krafcik | |
| 6,369,132 | B2 | 4/2002 | Sau | |
| 7,847,049 | B2 | 12/2010 | Ito et al. | |
| 7,887,789 | B2 | 2/2011 | Harris et al. | |
| 8,691,052 | B2 | 4/2014 | Zhang et al. | |

(Continued)

FOREIGN PATENT DOCUMENTS

| | | |
|---|---|---|
| CN | 102532474 A | 7/2012 |
| CN | 103068868 A | 4/2013 |

(Continued)

OTHER PUBLICATIONS

References cited in the International Search Report of International Application No. PCT/US20/044484.

E. Alami et al. Aggregation of Hydrophobically End-Capped Poly-(ethylene oxide) in Aqueous Solutions. Fluorescence and Light-Scattering Studies Department of Physical Chemistry, University of Uppsala, Macromolecules 1966, 29, 2229-2243.

"E. Alami et al. Model Hydrophobically End-Capped Poly(ethylene oxide) in Water Institut Charles Sadron Centre National de la Recherche Scientifique—Université Louis Pasteur Chapter DOI: 10.1021/ba-1996-0248.ch018; Hydrophilic Polymers; Chapter 18, pp. 343-362; Advances in Chemistry, vol. 248".

"JeanneFrançois et al Association in water of model hydrophobically end-capped poly(ethylene oxide) Institut Charles Sadron, Université Louis Pasteru, 6 rue Boussignaul Progress in Organic Coatings vol. 24, Issues 1-4, Jun.-Sep. 1994, pp. 67-79".

*Primary Examiner* — Mark Eashoo
*Assistant Examiner* — Zhen Liu
(74) *Attorney, Agent, or Firm* — Aseem Mehta; Nathalie Tietcheu

(57) ABSTRACT

The presently disclosed and/or claimed inventive concept(s) relates to a method for preparing a reaction product, comprising (1) molten mixing a first active hydrogen containing component and a first alkali hydroxide to form a first mixture; (2) adding water into the first mixture to dissolve the first molten alkali hydroxide to form a second mixture; (3) reacting a first hydrophobic component with the second mixture to provide a Diluent; (4) molten mixing at least one second active hydrogen containing component, a second alkali hydroxide and the Diluent to form a third mixture; (5) adding water into the third mixture to dissolve the second molten alkali hydroxide to form a fourth mixture; and (6) reacting the fourth mixture with a gem-polyhalide compound or a sulfonate ester for a sufficient time to form the reaction product. Also, disclosed is a water soluble or dispersible composition comprising a diluent and a polymer.

18 Claims, No Drawings

(56) References Cited

U.S. PATENT DOCUMENTS

| | | | | |
|---|---|---|---|---|
| 2002/0052441 | A1* | 5/2002 | Burdick .................. | C09K 3/00<br>524/501 |
| 2003/0161791 | A1 | 8/2003 | Bentley et al. | |
| 2004/0060473 | A1 | 4/2004 | Bauer et al. | |
| 2005/0150418 | A1 | 7/2005 | Bakeev et al. | |
| 2006/0135586 | A1 | 6/2006 | Kozlowski et al. | |
| 2010/0280277 | A1 | 11/2010 | King et al. | |
| 2013/0030091 | A1 | 1/2013 | Bhargava et al. | |
| 2015/0038422 | A1 | 2/2015 | Bossard et al. | |
| 2017/0073468 | A1 | 3/2017 | Mcmanus et al. | |
| 2018/0105706 | A1 | 4/2018 | Korenkiewicz | |

FOREIGN PATENT DOCUMENTS

| | | | |
|---|---|---|---|
| CN | 109844039 | A | 6/2019 |
| CN | 112654562 | A | 4/2021 |
| DE | 4327494 | A1 | 2/1995 |
| EP | 0979850 | B1 | 5/2004 |
| EP | 2444432 | B1 | 2/2013 |
| EP | 1541643 | B1 | 3/2013 |
| EP | 2166043 | B1 | 4/2016 |
| EP | 2044263 | B1 | 9/2016 |
| WO | WO2004011525 | A1 | 2/2004 |
| WO | WO2013016612 | A1 | 1/2013 |
| WO | WO2020/047047 | A1 | 3/2020 |

* cited by examiner

SYNTHETIC THICKENERS INCORPORATING NON-REACTIVE DILUENTS

CROSS-REFERENCE TO RELATED APPLICATIONS

This application is a U.S. National Phase filing under 35 U.S.C. § 371 of International Application No. PCT/US2020/044484, filed Jul. 31, 2020, and published as WO/2021/022153 on Feb. 4, 2021, which claims benefit of priority U.S. Provisional Patent Application No. 62/881,621, filed Aug. 1, 2019, and priority of U.S. Provisional Patent Application No. 62,881,521, filed Aug. 1, 2019. The entire contents of each of the prior applications are incorporated herein by reference in their entirety.

FIELD

The presently disclosed process(es), procedure(s), method (s), product(s), result(s), and/or concept(s) (collectively referred to hereinafter as the "present disclosure") relates generally to a method for preparing a reaction product and an aqueous protective coating composition comprising the reaction products thereof.

BACKGROUND

Water-soluble polymers (also commonly referred to as "thickeners" or "rheology modifiers") are widely used in many industrial water-borne systems as additives to modify the systems' flow behavior. Thickeners increase and maintain viscosity at required levels under specified processing conditions and end-use situations. Thickeners are useful, for example, in decorative and protective coatings, paper coatings, cosmetics and personal care products, detergents, pharmaceuticals, adhesives and sealants, agricultural formulations, and petroleum drilling fluids.

Thickeners can be natural products, directly derived from natural products, or synthetically manufactured. Examples of natural thickeners may include, but are not limited to, casein, alginates, gum tragacanthins, guar, xanthan gum, locust and bean gum. Examples of naturally-derived thickeners may include, but are not limited to, cellulose ethers derived from cellulosics, such as hydroxyethyl cellulose (HEC), hydroxypropyl cellulose (HPC), and carboxymethyl cellulose (CMC). These natural and naturally-derived products (collectively, "natural products") vary in their thickening efficiency. One drawback of the natural products is that they are susceptible to microbial attack and hence, may require the addition of antimicrobial agents to the formulation. Examples of synthetic thickeners (also called "associative thickeners" or "associative polymers") may include, but are not limited to, various acrylic polymers, alkylene oxide polymers, amide polymers, and maleic anhydride polymers. Synthetic thickeners may also include non-ionic synthetic associative thickeners (NSAT) rheology modifiers, such as hydrophobically-modified ethoxylated urethane (HEUR), hydrophobically-modified polyethylene glycol (HmPEG) and hydrophobically-modified polyacetal-polyether (HmPAPE). These synthetic thickeners can be homopolymers or copolymers. Some of these polymers' hydrolytic stability depends on the pH of the solution and others are sensitive to various components normally found in aqueous coatings.

In recent years, synthetic associative thickeners have been used in a variety of applications including adhesives and personal care, and in industrial applications such as construction, specialty coatings, waterborne coatings, and latex paints. Synthetic associative thickeners serve several roles in aqueous systems. For instance, in latex paints and waterborne coatings, the thickener can provide improved stability and pigment suspension, as well as improved rheological and application properties. Additionally, synthetic associative thickeners can be prepared with certain properties in mind because they are synthesized from basic chemicals. In other words, synthetic associative thickeners can be tailored for desired and/or targeted properties from the ground up.

Typically, production of the NSAT polymers of either HEUR or HmPAPE chemistry is based upon starting with a commercial hydroxyl-terminated PEG, typically of MW ~8,000, and randomly coupling the chains together to form a higher molecular weight polymer. Capping of the chains with hydrophobes serves to introduce associative behavior when the polymer is dissolved in water. Polymer molecular weight distribution, type of hydrophobe, and concentration all have a significant impact on solution rheology characteristics. The process of increasing molecular weight by random coupling of chains leads to well-prescribed final molecular weight distributions. However, the production of high molecular weight NSAT polymers is somewhat limited due at least in part to process conditions during synthesis, which can limit and/or reduce control over certain properties of the resulting NSAT, including, but not limited to, molecular weight and polydispersity and Brookfield, KU, and ICI viscosities.

Accordingly, a need exists for a synthetic associative thickener that can provide flexibility in synthesis for targeting the specific properties and satisfy a wide range of rheology requirements for paints.

DETAILED DESCRIPTION

Before explaining at least one embodiment of the present disclosure in detail, it is to be understood that the present disclosure is not limited in its application to the details of construction and the arrangement of the components or steps or methodologies set forth in the following description. The present disclosure is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the present disclosure shall have the meanings that are commonly understood by those of ordinary skill in the art. Further, unless otherwise required by context, singular terms shall include pluralities and plural terms shall include the singular.

All patents, published patent applications, and non-patent publications mentioned m the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

All of the articles and/or methods disclosed herein can be made and executed without undue experimentation in light of the present disclosure. While the articles and methods of the present disclosure have been described in terms of preferred embodiments, it will be apparent to those of ordinary skill in the art that variations may be applied to the articles and/or methods and in the steps or in the sequence of steps of the method(s) described herein without departing from the concept, spirit and scope of the present disclosure. All such similar substitutes and modifications apparent to those skilled in the art are deemed to be within the spirit, scope and concept, of the present disclosure.

As utilized in accordance with the present disclosure, the following terms, unless otherwise indicated, shall be understood to have the following meanings.

The use of the word "a" or "an" when used in conjunction with the term "comprising" may mean "one," but it is also consistent with the meaning of "one or more," "at least one," and "one or than one." The use of the term "or" is used to mean "and/or" unless explicitly indicated to refer to alternatives only if the alternatives are mutually exclusive, although the disclosure supports a definition that refers to only alternatives and "and/or." Throughout this application, the term "about" is used to indicate that a value includes the inherent variation of error for the quantifying device, the method(s) being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it is attached. In addition, the quantities of 100/1000 are not to be considered limiting as lower or higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first", "second", "third", "fourth", etc.) is solely for the purpose of differentiating between two or more items and, unless otherwise stated, is not meant to imply any sequence or order or importance to one item over another or any order of addition.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The terms "or combinations thereof" and "and/or combinations thereof" as used herein refer to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more items or terms, such as BB, AAA, AAB, BBC, AAABCCCC, CBBAAA, CABABB, and so forth. The skilled artisan will understand that typically there is no limit on the number of items or terms in any combination, unless otherwise apparent from the context.

For purposes of the following detailed description, other than in any operating examples, or where otherwise indicated, numbers that express, for example, quantities of ingredients used in the specification and claims are to be understood as being modified in all instances by the term "about". The numerical parameters set forth in the specification and attached claims are approximations that may vary depending upon the desired properties to be obtained in carrying out the invention.

The term "alkyl" refers to a saturated linear or branched hydrocarbon group of 1 to 50 carbons.

The term "alkylene" as used herein refers to an unsaturated, linear or branched hydrocarbon group of 1 to 50 carbon atoms with one or more carbon-carbon double bonds.

The term "alkylyne" as used herein refers to an unsaturated, linear or branched hydrocarbon group of 1 to 50 carbon atoms with one or more carbon-carbon triple bonds.

The term "aryl" refers to a mono- or polynuclear aromatic hydrocarbon group including carbocyclic and heterocyclic aromatic groups.

The term "hydrophobic" or "hydrophobically modified" as used herein refers to containing an alkyl, alkylene, alkylyne, and/or aryl group(s).

The term "monomer" refers to a molecule, typically having a molecular weight of less than or equal to about 1,000 Daltons, that chemically bonds during polymerization to one or more monomers of the same or different kind to form a polymer.

The term "polymer" refers to a macromolecular compound, typically having a molecular weight of from about 1,000 to about 500,000 Daltons, comprising one or more types of monomer residues (repeating units) connected by covalent chemical bonds. By this definition, polymer encompasses compounds wherein the number of monomer units may range from very few, which more commonly may be called as oligomers, to very many. Non-limiting examples of polymers include homopolymers, and non-homopolymers such as copolymers, terpolymers, tetrapolymers and the higher analogues.

All percentages, ratio, and proportions used herein are based on a weight basis unless other specified.

Turning now to particular embodiments, the presently disclosed and claimed inventive concept(s) relate to a method for preparing a reaction product, in-situ process, physical blend, or composition incorporating non-reactive diluent(s). Such a method, in-situ process, physical blend, or composition allows for greater flexibility in the design of polymers that can provide a spectrum of rheological characteristics for a variety of end-use applications. This allows for control over certain properties that may be used to tailor the paint rheology. More specifically, it has been found that such a method, in-situ process, physical blend, or composition incorporating non-reactive diluent(s) may be used, for example, to tailor paint rheology to control the balance of Brookfield, KU, and ICI viscosities, depending on the identity and the concentration of the non-reactive diluent(s) selected. It is to such methods and compositions that the presently disclosed and claimed inventive concept(s) is directed.

Hydrophobically-Modified Polyethylene Glycol Diluents

In one non-limiting embodiment, the method comprises: (1) molten mixing a first active hydrogen containing component and a first alkali hydroxide to form a first mixture; (2) adding water into the first mixture to dissolve the first molten alkali hydroxide to form a second mixture; (3) reacting a fast hydrophobic component into the second mixture to provide a diluent; (4) molten mixing at least one second active hydrogen containing component, a second alkali hydroxide and the diluent to form a third mixture; (5) adding water into the third mixture to dissolve the second molten alkali hydroxide to form a fourth mixture; and (6) reacting the fourth mixture with a gem-polyhalide compound or as sulfonate ester for a sufficient time to form the reaction product.

In another non-limiting embodiment, the method further includes a step (7) reacting a second hydrophobic component with the reaction product. In one non-limiting embodiment, the reaction product can be poly(acetal- or ketal-polyether). In some non-limiting embodiments, step (7) may be repeated any number of times, such as 1 time, or 2 times, or 3 times, or 4 times, or 5 times, or more, wherein the second hydrophobic component may be varied between subsequent steps.

The first and second active hydrogen containing components can be identical or different and can each independently be monofunctional, comprising a single functional group of OH, SH, or $NH_2$. In one non-limiting embodiment, the first and second monofunctional active hydrogen containing components can each independently be represented by Formula (I):

D-X  Formula (I)

where X is OH, SH, or $NH_2$ and D is substituted or unsubstituted, alkoxylated or non-alkoxylated, and/or pure or mixed cut alkylene, alkyne, alkenyl, alkenyl, aryl, alkylaryl, arylalkylene, aryl alkyne, arylalkenyl, arylalkynyl, cyclic, cycloaliphatic, or polycyclic moiety(ies). For instance, by way of example only, the first and second monofunctional active hydrogen containing components may independently be an alkoxylated or non-alkoxylated alcohol, which can each independently be represented by the formula (Ia).

Formula (Ia)

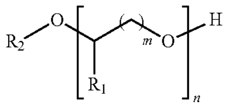

where $R_1$ is H or alkyl (such as $CH_3$); m is an integer in a range of from 1 to 3; n is an integer in a range of from 0 to 500 (alkoxylated or non-alkoxylated alcohols); $R_2$ is a linear or branched, and/or substituted or unsubstituted alkyl, alkylene, alkenyl, alkylyne, alkynyl, aryl, arylalkylene, arylalkenyl, arylalkynyl, cyclic, or cycloaliphatic containing a range of from 1 to 30 carbons in the longest carbon chain of the alcohol or alcohol alkoxylate.

$R_2$ can be independently represented by the formula Ib.

to

Formula (Ib)

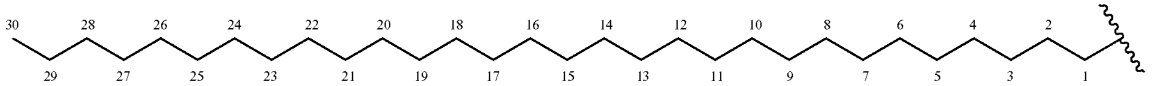

Substitution, branching, saturation, unsaturation, or cyclization can occur anywhere between carbon 1 and carbon 30 of $R_2$. One or more branched side-chain(s) containing a range of from 1 to 30 carbons can be found anywhere from carbon 1 to carbon 30 in $R_2$. The one or more branched side-chain(s) can also be substituted or unsubstituted alkyl, alkylene, alkenyl, alkylyne, alkynyl aryl, arylalkylene, arylalkenyl, arylalkynyl, cyclic, or cycloaliphatic.

Examples of alkoxylated or non-alkoxylated alcohol monofunctional active hydrogen containing components can include, but are not limited to: 1-butanol, 1-pentanol, 1-hexanol, 1-heptanol, 1-octanol, 1-nonanol, 1-decanol, 1-undecanol, 1-dodecanol, 1-tridecanol, 1-tetradecanol, 1-pentadecanol, 1-hexadecanol, 1-heptadecanol, 1-octadecanol, 1-nonadecanol, 1-eicosanol, 1-docosanol, 1-tricosonal, 1-tetracosanol, 1-hexacosanol, 1-heptacosanol, 1-octacosanol, 1-nonacosanol, 1-triacontanol, 3-methyl-3-buteno-1-ol, 3-buteno-1-ol, 2-butanol, 3-methyl-1-butanol, 2-ethyl-1-pentanol, 2,4-dimethyl-1-pentanol, 2,3-dimethyl-1-pentanol, 2-propyl-1-pentanol, 3-ethyl-2-methyl-1-pentanol, 2,3,4-trimethyl-1-pentanol, 2-(1-methylethyl)-1-pentanol, 4-methyl-2-propyl-1-pentanol, 3-methyl-2-propyl-1-pentanol, 2,3-diethyl-1-pentanol, 3-ethyl-2,4-dimethyl-1-pentanol, 2,4,4-trimethyl-1-pentanol, 3-pentanol, 2-pentanol, 2-methyl-3-pentanol, 3-methyl-2-pentanol, 4-penten-2-ol, 3-ethyl-2-pentanol, 3,4-dimethyl-2-pentanol, 4-methyl-3-(1-methylethyl)-2-pentanol, 4-methyl-4-penten-2-ol, 3-methyl-4-penten-2-ol, 3-methyl-2-pentyn-2-ol, 5-hexen-1-yn-ol, 1,5-hexane-3-ol, 1-hepten-4-ol, 2-methyl-1-hexanol, 2-ethyl-hexen-1-ol, 2-methyl-1-heptanol, 3-methyl-2-hexanol, 2-ethyl-1-heptanol, 4-methyl-3-heptanol, 3-methanol-2-heptanol, 2,4-dimethyl-1-hexanol, 2,5-dimethyl-1-hexanol, 2-ethyl-1-hexanol, 3-ethyl-2-hexanol, 2-butyl-1-hexanol, 2-ethyl-4-methyl-1-hexanol, 3-propyl-2-hexanol, 2-(1-methylethyl)-1-hexanol, 2-ethyl-3-methyl-1-hexanol, 2-ethyl-5-methyl-1-hexanol, 3-ethyl-2-methyl-1-hexanol, 4-ethyl-2-methyl-1-hexanol, 4-methyl-2-propyl-1-hexanol, 5-methyl-2-propyl-1-hexanol, 4-methyl-2-hexanol, 4-methyl-3-hexanol, 2-methyl-3-hexanol, 5-methyl-3-hexanol, 3-hexanol, 5-hexen-3-ol, 5-methyl-2-hexanol, 2,6-dimethyl-1-heptanol, 2-propyl-1-heptanol, 3-ethyl-2-heptanol, 2,5-dimethyl-1-heptanol, 2,4-dimethyl-1-heptanol, 2,3-dimethyl-1-heptanol, 4-ethyl-3-heptanol, 2-butyl-1-octanol, 2-methyl-1-octanol, 2-ethyl-1-octanol, 5-methyl-4-octanol, 3-methyl-2-octanol, 4-methyl-3-octanol, 4-octanol, 3-octanol, 2,7-dimethyl-1-octanol, 5-ethyl-4-octanol, 6-ethyl-4-octanol, 2-methyl-1-nonanol, 2-methyl-5-nonanol, 4-methyl-5-nonanol, 7-methyl-4-nonanol, 7-methyl-5-nonanol, 3-nonanol, 2-nonanol, 2-methyl-1-decanol, 2-decanol, 5-decanol, 6-ethyl-4-decanol, 2-ethyl-1-undecanol 2-propyl-1-undecanol, 2-butyl-1-undecanol, 2-(1-methylethyl)-1-undecanol, 2-(2-methylpropyl)-1-undecanol, 2-heptyl-1-undecanol, 2-(1,1-dimethylethyl)-1-undecanol, 2-(2-propen-1-yl)-1-undecanol, 8-methyl-4-undecanol, 3-ethyl-2-dodecanol, 2-propyl-1-dodecanol, 2-ethyl-1-dodecanol, 2-butyl-1-dodecanol, 2-(1-methylethyl)-1-dodecanol, 2-(2-methylpropyl)-1-dodecanol, 2-hexyl-1-dodecanol, 2-(1-methylethyl)-2-dodecanol, 4-dodecanol, 5-dodecanol, 6-dodecanol, 2-octyl-1-dodecanol, 2-(1,1-dimethylethyl)-1- dodecanol, 3-(1-methylethyl)-2-tridecanol, 2-nonyl-1-tridecanol, 4-tridecanol, 5-tridecanol, 6-tridecanol, 7-tridecanol, 2-ethyl-1-tetradecanol, 2-propyl-1-tetradecanol, 2-(1-methylethyl)-1-tetradecanol, 2-octyl-1-tetradecanol, 2-(2-methylpropyl)-1-tetradecanol, 2-dodecyl-1-tetradecanol, 2-(1,1-dimethylethyl)-1-tetradecanol, 2-decyl-1-tetradecanol, 3-(1-methylethyl)-2-pentadecanol, 3-ethyl-2-pentanedecanol, poly(ethylene glycol) methyl ether, tristyrylphenol-polyglycolether, ethylene oxide/propylene oxide-copolymer-monobutyl ether, polyalkylene glycol monovinyl ether, polyethylene glycol monoallyl ether, C4 ethoxylate, C6 ethoxylate, C8 ethoxylate, C10 ethoxylate, C12 ethoxylate, C16 ethoxylate, C16/C18 ethoxylate, C18 ethoxylate, C22 ethoxylate, and isotridecyl ethoxylate.

The first and second active hydrogen containing components can be identical or different and can each independently be at least difunctional, comprising at least two functional groups of OH, SH, or $NH_2$. The term "at least difunctional" may include difunctional, trifunctional, and tetrafunctional active hydrogen containing components. In one non-limiting embodiment, the first and second at least difunctional active hydrogen containing components can each independently be represented by Formula (II), (III), or (IV):

Formula (II)

X—D—X

Formula (III)

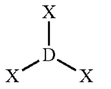

Formula (IV)

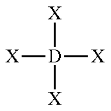

where X is OH, SH, or $NH_2$ and D is a substituted or unsubstituted, alkoxylated or non-alkoxylated, and/or pure or mixed cut alkylene, alkyne, alkenyl, alkynyl, aryl, alkylaryl, arylalkylene, aryl alkyne, arylalkenyl, arylalkynyl, cyclic, cycloaliphatic, or polycyclic moiety.

For instance by way of example only, the first and second at least difunctional active hydrogen containing components may each independently be represented by Formula (V) as shown below:

Formula (V)

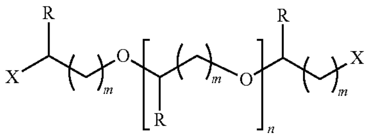

where X is OH, SH, or $NH_2$; R is H or alkyl; m is an integer in a range of from 1 to 3; and n is an integer in a range of from 0 to 500.

For example, but not by way of limitation, the first and second at least difunctional active hydrogen containing components can each independently comprise a dihydric alcohol, a polyol, or a polyetheramine.

The dihydric alcohol may be polyethylene glycol. Examples of polyethylene glycol can include, but are not limited to, commercial products such as Polyethylene Glycol 200, Polyethylene Glycol 300, Polyethylene Glycol 400, Polyethylene Glycol 600, Polyethylene Glycol 1000, Polyethylene Glycol 1500, Polyethylene Glycol 3350, Polyethylene Glycol 4000, Polyethylene Glycol 6000, Polyethylene Glycol 8000 and Polyglykol 400, Polyglykol 600, Polyglykol 4000S, Polyglykol 8000S, Polyglykol 9000S, Polyglykol 20000S, Polyglykol 35000S that are commercially available from Clariant.

Other dihydric alcohols can include, but are not limited to, aminoethylpolyethylene glycol such as O-(2-Aminoethyl) polyethylene glycol 3000, and O-(2-Aminoethyl)polyethylene glycol 5000.

The polyetheramine can be dihydric polyetheramines containing primary amino groups attached to the end of a polyether backbone such as, but not limited to, Jeffamine® polyetheramines.

The polyol is a compound having three or more hydroxyl groups. Examples of the polyol used in the present disclosure can include, but are not limited to, Voranol™ Triol Polyether Polyols (commercially available from the DowDuPont Inc.); glycerin initiated, ethylene oxide triols including JEFFOL® G31-28 Polyol, JEFFOL® G31-35 Polyol and JEFFOL® G31-43 Polyol (commercially available from Huntsman Corporation).

The first and second hydrophobic components can be identical or different and can each independently be monofunctional, comprising a single functional group of Br, Cl, I, F, or sulfonate ester. In one non-limiting embodiment, the first and second monofunctional hydrophobic components can each independently be a sulfonate ester or represented by Formula (VI):

Z-G Formula (VI)

where Z is Br, Cl, I, or F; and G is a substituted or unsubstituted, and/or alkoxylated or non-alkyoxlyated alkylene, alkyne, alkenyl, alkynyl, aryl, alkylaryl, arylalkylene, aryl alkyne, arylalkenyl, arylalkynyl, cyclic, cycloaliphatic, or polycyclic moiety(ies). For instance, by way of example only, the first and second hydrophobic components can each independently be alkyl halides or sulfonate esters. The second hydrophobic component can be alkyl halides, sulfonate esters, or monoepoxides. Examples of alkyl halides can include, but are not limited to, 1-bromobutane, 1-bromohexane, 1-bromoheptane, 1-bromooctane, 1-bromodecane, 1-bromododecane, 1-bromotetradecane, 1-bromohexadecane, 1-bromooctadecane, and 1-bromodocosane.

In one non-limiting embodiment, the second hydrophobic component can be a sulfonate ester or represented by Z-G, or

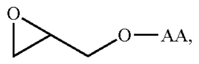

where Z is Br, Cl, I, or F; G is a substituted or unsubstituted, and/or alkoxylated or non-alkoxylated alkylene, alkyne, alkenyl, alkynyl, aryl, alkylaryl, arylalkylene, aryl alkyne, arylalkenyl, arylalkynyl, cyclic, cycloaliphatic, or polycyclic moiety(es); and AA is a substituted or unsubstituted, and/or alkoxylated or non-alkoxylated alkylene, alkyne, alkenyl, alkynyl, aryl, alkylaryl, arylalkylene, aryl alkyne, arylalkenyl, arylalkynyl, cyclic, cycloaliphatic, or polycyclic moiety(ies). Examples of monoepoxides can include, but are not limited to, allylglycidyl ether (AGE), 2-Ethylhexylglycidyl ether (EHGE), hexadecylglycidyl ether (HAGE-13, commercially available from Sachem), Oxirane [(Docosyloxy), methyl] (HAGE-22, commercially available from Sachem), naphthylglycidyl ether (NGE), n-butylglycidyl ether (n-BGE), iso-Butylglycidyl ether (iso-BGE), and Cardura™ E10P glycidyl ether, Cardolite® Ultra LITE 513 (glycidyl ether based on cashew nutshell liquid technology), and glycidyl ester of Versatic™ acid 10 (Hexion).

In certain non-limiting embodiments, the first and second hydrophobic components may each independently include an active hydrogen containing component. For instance, by way of example only, the hydrophobic components may independently comprise an active hydrogen containing component that can be an alkoxylated or non-alkoxylated, and/or substituted or unsubstituted, and/or pure or mixed cut alkylene, alkyne, alkenyl, alkynyl, aryl, alkylaryl, arylalkylene, aryl alkyne, arylalkenyl, arylalkynyl, cyclic, cycloaliphatic, or polycyclic moiety(ies). Non-limiting, examples of such hydrophobic components containing an active hydrogen containing component can include those hydrophobic components as described above, and may include tristyrylphenol-polyglycolether commercially available as Emulsogen TS100 from Clariant; C12 ethoxylate commercially available as Novel 12-10 ethoxylate from Sasol; C16 ethoxylate commercially available as Novel 16-10 ethoxylate from Sasol; C16 ethoxylate commercially available as Alkonat C 200 from Oxiteno; C16/C18 ethoxylate commercially available as Genapol O100 from Clariant; C18 ethoxylate commercially available as Genapol HS200 from Clariant or as Novel 18-20 ethoxylate from Sasol; C22 ethoxylate commercially available as Novel 22-25 ethoxylate from Sasol, and Cardolite® GX-5170 (ethoxylate surfactant based on cashew nutshell liquid technology).

When the hydrophobic component(s) contains an active hydrogen containing component, examples of the hydrophobic component(s) can also include, but are not limited to, polyethylene glycol monomethacrylates, alcohols, amines, and thiols. An example of polyethylene glycol monomethacrylate can include Genangen M 5000 MA which is commercially available from Clariant. Examples of amines can include, but are not limited to, octylamine, decylamine, dodecylamine, hexadecylamine, and octadecylamine. Examples of thiols can include, but are not limited to, 1-octanethiol, 1-decanethiol, 1-dodecanethiol, 1-hexadecanethiol, and 1-octadecanethiol.

In another non-limiting embodiment, the first and second hydrophobic components can be identical or different and can each independently be at least difunctional, comprising at least two functional groups of Br, Cl, I, F, or sulfonate ester. The term "at least difunctional" may include difunctional, trifunctional, and tetrafunctional hydrophobic components. In one non-limiting embodiment, the first and second at least difunctional hydrophobic components can each independently be a sulfonate ester or represented by Formula (VII), (VIII), or (IX):

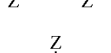
Formula (VII)

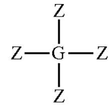
Formula (VIII)

Formula (IX)

where Z is Br, Cl, I, or F; and G is a substituted or unsubstituted, and/or alkoxylated or non-alkoxylated alkylene, alkyne, alkenyl, alkynyl, aryl, alkylaryl, arylalkylene, aryl alkyne, arylalkenyl, arylalkynyl, cyclic, cycloaliphatic, or polycyclic moiety(ies). Such hydrophobic components can independently be dialkyl halides, polyalkylhalides, or sulfonate esters. Examples of the hydrophobic components can include, but are not limited to, pentaerythrityl tetrabromide and 1,3,5-tris(bromomethyl) benzene.

The hydrophobically-modified-polyethylene glycol diluent is formed by capping the active hydrogen containing component with the first hydrophobic component, resulting in di-endcapped hydrophobic groups. In certain non-limiting embodiments, the di-endcapped hydrophobic groups comprise at least 50%, or at least 55%, or at least 60%, or at least 65%, or at least 70%, or from about 70% to about 98% by weight based on the total weight of the active hydroxyl groups. In certain non-limiting embodiments, the hydrophobically-modified-polyethylene glycol diluent may be at least 50% di-endcapped, or at least 60% di-endcapped, or at least 70% di-endcapped, or at least 80% di-endcapped, or at least 85% di-endcapped, or at least 90% di-endcapped, or at least 93% di-endcapped, or at least 95% di-endcapped, or at least 96% di-endcapped, or at least 97% di-endcapped, or at least 98% di-endcapped, or at least 99% di-endcapped, or 100% di-endcapped. The hydrophobically-modified-polyethylene glycol diluent may be "highly capped." The term "highly capped" as used herein refers to a non-reactive diluent that is at least 80% di-endcapped, more particularly at least 85% di-endcapped, more particularly at least 90% di-endcapped, more particularly at least 93% di-endcapped, more particularly at least 95% di-endcapped, more particularly at least 96% di-endcapped, more particularly at least 97% di-endcapped, more particularly at least 98% di-endcapped, or more particularly at least 99% di-endcapped. A weight average molecular weight of the hydrophobically-modified-polyethylene glycol diluent can be in a range of from about 500 to about 20,000 Daltons, or from about 500 to about 13,000 Daltons, or from about 500 to about 12,000 Daltons, or from about 500 to about 11,000 Daltons, or from about 500 to about 10,000 Daltons, or from about 500 to about 9,000 Daltons, or from about 500 to about 8,000 Daltons, or from about 500 to about 7,000 Daltons, or from about 500 to about 6,000 Daltons, or from about 500 to about 5,000 Daltons, or from about 3,500 to about 10,000, or from about 3,500 to about 9,000, or from about 3,500 to about 8,000, or from about 3,500 to about 7,000, or from about 3,500 to about 6,000, or from about 3,500 to about 5,000, or from about 5,000 to about 13,000 Daltons, or from about 5,000 to about 10,000 Daltons, or from about 5,000 to about 9,000 Dalton, or from about 5,000 to about 8,000 Daltons, or from about 6,000 to about 10,000 Daltons, or from about 6,000 to about 9,000 Daltons, or from about 6,000 to about 8,000 Daltons, or from about 7,000 to about 10,000 Daltons, or from about 7,000 to about 9,000 Daltons, or from about 7,000 to about 8,000 Daltons, or from about 8,000 to about 10,000 Daltons, or from about 8,000 to about 9,000 Daltons.

The gem-polyhalide compound is selected from the group consisting of dibromomethane, dichloromethane, 1,1-dichlorotoluene, 1,1-dicholoroethane and 1,1-dibromoethane, pentaerythrityl tetrabromide, 1,3-dibromo-2-(bromomethyl)-2-methylpropane, 1,3-dichloro-2-(chloromethyl)-2-methylpropane, 2,2-dimethyl-1,3-dichloropropane, 1,3-dibromo-2,2-dimethylpropane, 1,3-dibromo-2-(bromomethyl)-propane, 1,3,5-tris(chloromethyl)benzene, p-xylylene dibromide, pentaerythritol tetrachloride, 1,3,5- tris(bromomethyl)benzene, 1-(bromomethyl)-4-(chloromethyl)-benzene, 1,3-dichloro-2-(chloromethyl)propane.

The sultanate ester(s) is derived from mono, di, or poly alcohols. The sulfonate ester(s) can be tosylates, mesylates, triflates, brosylates, nosylates, tresylates, nonaflates, and the like. Specific examples of the sulfonate esters may include methane sulfonate, ethyl methane sulfonate, methyl trifluoromethanesulfonate, bromomethyl tosylate, chloromethyl tosylate, and methylene bis(toluene-4-sulfonate).

Polyglycidyl Polyether Diluents

In yet another non-limiting embodiment, the method comprises: (1) molten mixing a first polyglycidyl ether component and a first alkali hydroxide to form a first mixture; (2) adding water into the first mixture to dissolve the first molten alkali hydroxide to form a second mixture; (3) reacting a first active hydrogen containing component comprising a functional group of OH, SH, or $NH_2$ with the second mixture to form a third mixture; and (4) reacting a first hydrophobic component, wherein the first hydrophobic component can be a sulfonate ester or represented by Z-G (where Z is Br, Cl, I, or F and G is a substituted or unsubstituted, and/or alkoxylated or non-alkoxylated alkylene, alkyne, alkenyl, alkynyl, aryl, alkylaryl, arylalkylene, aryl alkyne, arylalkenyl, arylalkynyl, cyclic, cycloaliphatic, or polycyclic moiety(ies)) with the third mixture to provide a diluent.

In another non-limiting embodiment, the method further includes one or more of step(s) (5) molten mixing a second active hydrogen component, a second alkali hydroxide, and the diluent to form a fourth mixture, wherein the second active hydrogen component can be represented by Formula (I), (II), (III), or (IV); (6) adding water into the fourth mixture to dissolve the second molten alkali hydroxide to form a fifth mixture; and (7) reacting the fifth mixture with a gem-polyhalide compound or a sulfonate ester for a sufficient time to form a reaction product.

In another non-limiting embodiment, the method further includes a step (8) reacting a second hydrophobic component with the reaction product, wherein the second hydrophobic component(s) can each independently be a sulfonate ester, or represented by Z-G, or

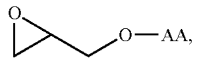

where Z is Br, Cl, I, or F; G is a substituted or unsubstituted, and/or alkoxylated or non-alkoxylated alkylene, alkyne, alkenyl, alkynyl, aryl, alkylaryl, arylalkylene, aryl alkyne, arylalkenyl, arylalkynyl, cyclic, cycloaliphatic, or polycyclic moiety(ies); and AA is a substituted or unsubstituted, and/or alkoxylated or non-alkoxylated alkylene, alkyne, alkenyl, alkynyl, aryl, alkylaryl, arylalkylene, aryl alkyne, arylalkenyl, arylalkynyl, cyclic, cycloaliphatic, or polycyclic moiety(ies). In some non-limiting embodiments, step (8) may be repeated any number of times, such as 1 time, or 2 times, or 3 times, or 4 times, or 5 times, or more, wherein the second hydrophobic component may be varied between subsequent steps.

Alternatively, the polymer molecular weight can be built up by using polyglycidyl ether. In this embodiment, the method steps (1)-(4) described above can further include one or more of step(s) (5) molten mixing a second alkali hydroxide, a second polyglycidyl ether, and the diluent to form a fourth mixture; and (6) adding water into the fourth mixture to dissolve the second molten alkali hydroxide to form a fifth mixture.

In another non-limiting embodiment, following steps (1)-(4), polyglycidyl ether can be used to build molecular weight and can include one or more of step(s) (5) molten mixing a second active hydrogen component, a second alkali hydroxide, a second polyglycidyl ether, and the diluent to form a fourth mixture, wherein the second active hydrogen component can be represented by Formula (I), (II), (III), or (IV); and (6) adding water into the fourth mixture to dissolve the second molten alkali hydroxide to form a fifth mixture.

In other non-limiting embodiments, the methods using polyglycidyl ether to build molecular weight further include a step (8) reacting a second hydrophobic component with the fifth mixture, wherein the second hydrophobic component is a sulfonate ester, or represented by Z-G or

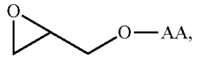

where Z is Br, Cl, I, or F; G is a substituted or unsubstituted, and/or alkoxylated or non-alkoxylated alkylene, alkyne, alkenyl, alkynyl, aryl, alkylaryl, arylalkylene, aryl alkyne, arylalkenyl, arylalkynyl, cyclic, cycloaliphatic, or polycyclic moiety(ies); and AA is a substituted or unsubstituted, and/or alkoxylated or non-alkoxylated alkylene, alkyne, alkenyl, alkynyl, aryl, alkylaryl, arylalkylene, aryl alkyne, arylalkenyl, arylalkynyl, cyclic, cycloaliphatic, or polycyclic moiety(ies). In another non-limiting embodiment, step (8) may be repeated any number of times, such as 1 time, or 2 times, or 3 times, or 4 times, or 5 times, or more, wherein the second hydrophobic component may be varied between subsequent steps.

The polyglycidyl ether component(s) can each independently be represented by Formula (X), (XI), (XII), or (XIII):

Formula (X)

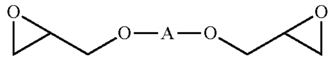

Formula (XI)

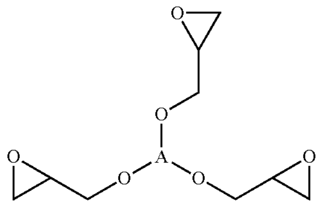

Formula (XII)

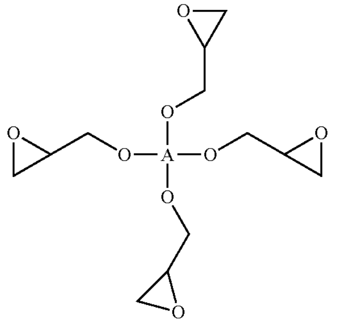

-continued

Formula (XIII)

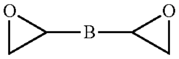

where A is a substituted or unsubstituted, and/or alkoxylated or non-alkoxylated alkylene, alkyne, alkenyl, alkynyl, aryl, alkylaryl, arylalkylene, aryl alkyne, arylalkenyl, arylalkynyl, cyclic, cycloaliphatic, or polycyclic moieties; and B is $CH_2OCH_2$.

Non-limiting examples of the polyglycidyl ether component can also include:

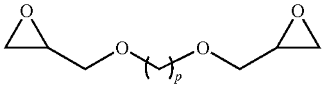

p = 1-6

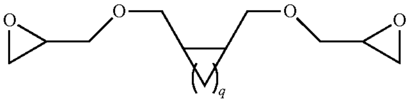

q = 1-6

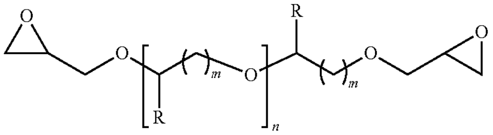

R = H or alkyl
n = 0-500
m = 1-3

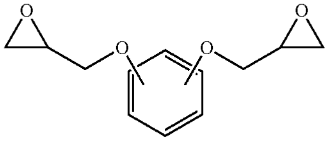

ortho, meta, or para

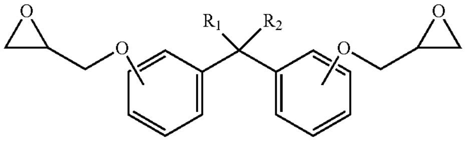

ortho, meta, or para
$R_1$ and $R_2$ = H or alkyl

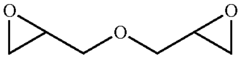

Diglycidyl ether (DGE)

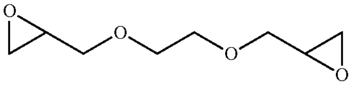

Ethylene glycol diglycidyl ether (EG DGE)

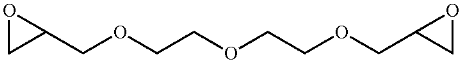

Diethylene glycol diglycidyl ether (DEG DGE)

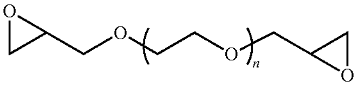

n = 1-25

Poly(ethylene glycol) diglycidyl ether (PEG DGE)

-continued

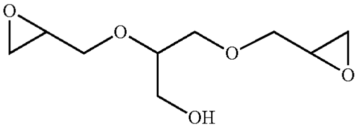

Glycerol diglycidyl ether (Glycerol DGE)

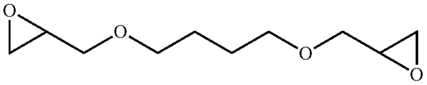

1,4-Butanediol diglycidyl ether (1,4-Butanediol DGE)

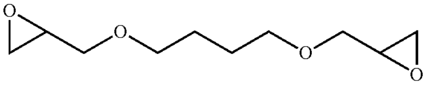

1,4-Hexanediol diglycidyl ether (1,6-Hexanediol DGE)

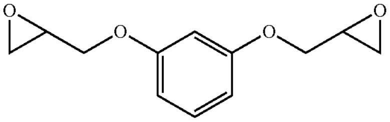

Resorcinol diglycidyl ether (Resorcinol DGE)

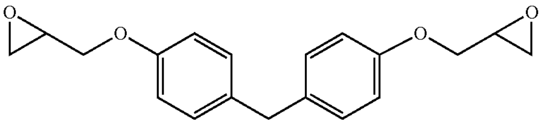

Bisphenol F diglycidyl ether (Bisphenol F DGE)

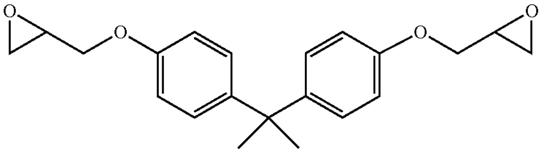

Bisphenol A diglycidyl ether (Bisphenol A DGE)

The polyglycidyl polyether diluent has no more than 20% free hydroxyl moieties, or more particularly, no more than 10% free hydroxyl moieties. A weight average molecular weight of the polyglycidyl polyether diluent can be in a range of from about 500 to about 20,000 Daltons, or from about 500 to about 13,000 Daltons, or from about 500 to about 12,000 Daltons, or from about 500 to about 11,000 Daltons, or from about 500 to about 10,000 Daltons, or from about 500 to about 9,000 Daltons, or from about 500 to about 8,000 Daltons, or from about 500 to about 7,000 Daltons, or from about 500 to about 6,000 Daltons, or from about 500 to about 5,000 Daltons, or from about 3,500 to about 10,000, or from about 3,500 to about 9,000, or from about 3,500 to about 8,000, or from about 3,500 to about 7,000, or from about 3,500 to about 6,000, or from about 3,500 to about 5,000, or from about 5,000 to about 13,000 Daltons, or from about 5,000 to about 10,000 Daltons, or from about 5,000 to about 9,000 Daltons, or from about 5,000 to about 8,000 Daltons, or from about 6,000 to about 10,000 Daltons, or from about 6,000 to about 9,000 Daltons, or from about 6,000 to about 8,000 Daltons, or from about 7,000 to about 10,000 Daltons, or from about 7,000 to about 9,000 Daltons, or from about 7,000 to about 8,000 Daltons, or from about 8,000 to about 10,000 Daltons, or from about 8,000 to about 9,000 Daltons.

Hydrophobically-Modified Ethoxylated Urethane Polymers with Isocyanate Diluents

In one non-limiting embodiment, a method for preparing a reaction product comprises: (1) reacting a first active hydrogen containing component and a first isocyanate-containing component to form a diluent; and (2) reacting a second active hydrogen containing component, a second isocyanate-containing component, a third active hydrogen containing component, and the diluent to provide the reaction product.

In one non-limiting embodiment, the method further includes a step (3) reacting an at least fourth active hydrogen containing component with the reaction product. In another non-limiting embodiment, step (3) may be repeated any number of times, such as 1 time, or 2 times, or 3 times, or 4 times, or 5 times, or more, wherein the fourth active hydrogen containing component may be varied between subsequent steps.

In some non-limiting embodiments, a first catalyst can be added into step (1) and a second catalyst can be added into step (2). The first and second catalysts can be identical or different. In one non-limiting embodiment, the first and second catalysts can each independently be selected from the group consisting of 1,4-Diazabicyclo[2.2.2]octane, 1,8-Diazabicyclo[5.4.0]undec-7-ene, 2-Methyl-2-azabicyclo[2.2.1]heptane, Bis (2-Dimethylaminoethyl) ether, N,N-Benzyldimethylamine, N,N-Dimethylcyclohexylamine, N,N-Dimethylethanolamine, Pentamethyldiethylenetriamine, 1,3,5-Tris[3-(dimethylamino)propyl]hexahydro-1,3,5-triazine, Dimethylaminopropyl amine, Dimethylethanol amine, N,N benzyldimethylamine, dimethylcyclohexylamine, 2,2-dimorphoinodiethyl ether, Tetramethylethylenediamine, Dimethyltetrahydropyrimidine, N,N',N"-Tris(dimethylaminopropyl) hexahydrotriazine, 2,2-dimorpholinyldiethylether, Bis-(2-dimethylaminoethyl)-ether, Triethylenediamine, N-methylmidazole, N-methylmorpholine, Triethylenediamine, 1-(3-Aminopropyl) imidazole, 1-(3-Hydroxypropyl) imidazole, N-((2-Hydroxy)-propyl) imidazole, Bis(dimethylamino)-2-hydroxypropanol, Bis(dimethylaminopropyl)-amino-2-propanol 1,2-Dimethylimidazole, Dimethylaminoethyoxyethanol, N,N,N',N'-Tetramethyl-1,6-hexanediamine, N,N',N'-Trimethylaminoethylpiperazine, 1,1'-[[(3-(dimethylamino) propyl]imino]bispropan-2-ol, N,N,N'-Trimethylaminoethylethanolamine, N,N,N',N'-Tetramethylpropylene diamine, N,N,N',N',N"-Pentamethyldiethylene triamine, N-Methylmorpholine, N-Ethylmorpholine, N,N-Dimethylcyclohexylamine, N-Methyldicyclohexylamine, Triethylenediamine, 2-Methyl-azanorbornane, Polycat SA-1™, Polycat SAS-102™, Polycat SA-610/50™, Tin(II) acetate, Tin(II) 2-ethylhexanoate, Tin(II) laurate, Tin(II) oleate, dibutyltin diacetate, dibutyltin dilaurate, dibutyltin maleate, dibutyltin di-2-ethylhexoate, dilauryltin diacetate, dioctyltin diacetate, trialkyltin hydroxide, dialkyltin oxide, dibutyltin disulfide, dibutyl tin diisooctylmaleate, dibutyltin dilauryl mercaptide, dibutyltin di(isooctylmercaptoacetate), dibutyltin bis(dodecyl mercaptide), Dimethyltin dichloride, Dioctyltin dilaurate, Dibutyltin bis(dodecyl mercaptide), dioctyltin dimercaptide (Witco Corp), Dibutyltin dimercaptide (Witco Corp), Dibutyltin diriicinolate, Zinc neodecanoate, Zinc(II) 2-ethylhexanoate, Iron acetylacetonate, Bismuth 2-ethylhexanoate, Bismuth neodecanoate Bismuth/Lithium Neodecanoate, Bismuth-trisoctoate, Bismuth Naphthenate, triphenyl bismuth, Bismuth trineodecanoate, Tetrakis(2,2,6,6-tetramethylheptane-3,5-dionato)zirconium (i.e. XC-6212), Zirconium(IV) acetylacetonate, Zirconium diacetate, Chelates of Zirconium and Aluminum, and Tetrakis(2,2,6,6-tetramethylheptane-3,5-dionato)aluminum.

In one non-limiting embodiment, the first, at least third, and at least fourth active hydrogen containing components can be identical or different and can each independently be monofunctional, comprising a single functional group of OH. Examples of such hydrogen containing components having a single functional group of OH are the same as those described previously.

In another non-limiting embodiment, the first and second active hydrogen containing components can be identical or different and can each independently be at least difunctional, comprising at least two functional groups of OH. The term "at least difunctional" may include difunctional, trifunctional, and tetrafunctional active hydrogen containing components. Examples of such hydrogen containing components having at least two functional groups of OH are the same as those described previously.

The first and second isocyanate-containing components can each independently comprise a monofunctional or at least difunctional group(s), as further described below. The term "isocyanate-containing" as used herein refers to containing at least one isocyanate group.

In one non-limiting embodiment, the first and second isocyanate-containing components can be identical or different and can each independently be monofunctional, comprising a single isocyanate group, and represented by Formula (XIII):

F—S    Formula (XIII)

where is a substituted or unsubstituted, and/or alkoxylated or non-alkoxylated alkylene, alkyne, alkenyl, alkynyl, aryl, alkylaryl, arylalkylene, aryl alkyne, arylalkenyl, arylalkynyl, cyclic, cycloaliphatic, or polycyclic moiety(ies); and S is an isocyanate group (NCO). Examples of such isocyanate-containing components can include, but are not limited to, methyl isocyanate, ethyl isocyanate, vinyl isocyanate, isopropyl isocyanate, propyl isocyanate, methoxymethyl isocyanate, butyl isocyanate, pentyl isocyanate, 3-isocyanatopropyl-1-yne, and dodecyl isocyanate.

In another non-limiting embodiment, the first and second isocyanate-containing components can be identical or different and can each independently be at least difunctional, comprising at least two isocyante groups. The term "at least difunctional" may include difunctional, trifunctional, and tetrafunctional isocyante containing components. In one non-limiting embodiment, the first and second at least difunctional isocyanate-containing components can each independently be represented by Formula (X), (XI) or (XII):

Formula (X)

Formula (XI)

Formula (XII)

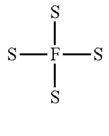

where F is a substituted or unsubstituted, and/or alkoxylated or non-alkoxylated alkylene, alkyne, alkenyl, alkynyl, aryl, alkylaryl, arylalkylene, aryl alkyne, arylalkenyl, arylalkynyl, cyclic, cycloaliphatic, or polycyclic moiety(ies); and S is an isocyanate group(s) (NCO).

In certain embodiments, the first and second isocyanate-containing components can be selected from an aromatic polyisocyanate, and an aliphatic and cycloaliphatic polyisocyanate.

Examples of the aromatic polyisocyanates can include, but are not limited to, 2,4- or 2,6-tolylene diisocyanate (TDI); 2,2'- or 2,4'- or 4,4'-diphenyl methane diisocyanate (MDI); naphthalene-1,5-diisocyanate; m-tetramethylxylene diisocyanate (m-TMXDI); m- or p-phenylene diisocyanate; triphenylmethane-4,4',4"-triisocyanate; and combinations thereof.

Examples of the aliphatic and cycloaliphatic polyisocyanate can include, but are not limited to, 1,4-butane diisocyanate, 1,6-hexane diisocyanate, 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- or -1,4-diisocyanate, 4,4'-diisocyanatodicyclohexylmethane (HMDI), 1-methyl-2,6-diisocyanatocyclodexane, 1-isocyanato-2-isocyanatomethyl cyclopentane, 1-isocyanato-3-isocyanato-methyl-3,5,5-trimethylcyclohexane (isophorone diisocyanate or IPDI), bis-(4-isocyanatocyclohexyl)-methane, 2,4'-dicyclohexylmethane diisocyanate, 1,3- or 1,4-bis-(isocyanatomethyl)-cyclohexane, bis-(4-isocyanato-3-methylcyclohexyl)-methane, α',α',α',α'-tetramethyl-1,3- and/or -1,4-xylylene diisocyanate, 1-isocyanato-1-methyl-4(3)-isocyanatomethyl cyclohexane, 2,4- or 2,6-hexahydrotoluylene diisocyanate, and combinations thereof.

The diluent derived from isocyanate-containing and hydrophobic alkoxylates is formed by capping the active hydrogen containing component with the first isocyanate component, resulting its di-endcapped hydrophobic groups. In certain non-limiting embodiments, the di-endcapped hydrophobic groups comprise at least 50%, or at least 55%, or at least 60%, or at least 65%, or at least 70%, or from about 70% to about 98% by weight based on the total weight of active hydroxyl groups. In certain non-limiting embodiments, the diluent derived from isocyanate-containing and hydrophobic alkoxylates may be at least 50% di-endcapped, or at least 60% di-endcapped, or at least 70% di-endcapped, or at least 80% di-endcapped, or at least 85% di-endcapped, or at least 90% di-endcapped, or at least 93% di-endcapped, or at least 95% di-endcapped, or at least 96% di-endcapped, or at least 97% di-endcapped, or at least 98% di-endcapped, or at least 99% di-endcapped, or 100% di-endcapped. The diluent derived from isocyanate-containing and hydrophobic alkoxylates diluent may be "highly capped." The term "highly capped" as used herein refers to a non-reactive diluent that is at least 80% di-endcapped, more particularly at least 85% di-endcapped, more particularly at least 90% di-endcapped, more particularly at least 93% di-endcapped, more particularly at least 95% di-endcapped, more particularly at least 96% di-endcapped, more particularly at least 97% di-endcapped, more particularly at least 98% di-endcapped, or more particularly at least 99% di-endcapped. A weight average molecular weight of the diluent derived from isocyanate-containing and hydrophobic alkoxylates can be in a range of from about 500 to about 20,000 Daltons, or from about 500 to about 13,000 Daltons, or from about 500 to about 12,000 Daltons, or from about 500 to about 11,000 Daltons, or from about 500 to about 10,000 Daltons, or from about 500 to about 9,000 Daltons, or from about 500 to about 8,000 Daltons, or from about 500 to about 7,000 Daltons, or from about 500 to about 6,000 Daltons, or from about 500 to about 5,000 Daltons, or from about 3,500 to about 10,000, or from about 3,500 to about 9,000, or from about 3,500 to about 8,000, or from about 3,500 to about 7,000, or from about 3,500 to about 6,000, or from about 3,500 to about 5,000, or from about 5,000 to about 13,000 Daltons, or from about 5,000 to about 10,000 Daltons, or from about 5,000 to about 9,000 Daltons, or from about 5,000 to about 8,000 Daltons, or from about 6,000 to about 10,000 Daltons, or from about 6,000 to about 9,000 Daltons, or from about 6,000 to about 8,000 Daltons, or from about 7,000 to about 10,000 Daltons, or from about 7,000 to about 9,000 Daltons, or from about 7,000 to about 8,000 Daltons, or from about 8,000 to about 10,000 Daltons, or from about 8,000 to about 9,000 Daltons.

The reaction product of the present disclosure can be used as a thickener in coatings. The use of a diglycidyl ether component as a reactant has created advantages in designing a thickener to achieve a wide variety of performance targets. For example, a balance of hydrophilic and hydrophobic functionalities can be controlled based on the specific requirement of the thickener. In addition, the types of hydrophobic groups and their amounts can be independently selected.

The present disclosure also relates to an aqueous protective coating composition comprising the reaction product(s) described previously. The aqueous protective coating composition can further comprise a latex polymer. The latex polymers can be made by polymerization of various ethylenically unsaturated monomers, such as ethylene, vinyl, and acrylic monomers. Oftentimes, the latex polymers are made by copolymerizing more than one monomer to achieve several desired properties, particularly for applications in latex paints with very little or no volatile organic compounds (VOCs).

Examples of the latex polymers used in the aqueous protective coating composition can include, but are not limited to, homo- or co-polymers of vinyl acetate, methacrylic acid, methylacrylate, methylmethacrylate, ethylacrylate, butyl acrylate, styrene, ethylene, vinyl chloride, vinyl ester of versatic acid (VeoVa), vinyl propionate, butadiene, acrylonitrile, maleates, and fumarates. In one non-limiting embodiment, the latex polymer is selected from the group consisting of acrylics, vinyl-acrylics, styrene-acrylics, and vinyl acetate ethylene (VAE).

Other polymers can include, but are not limited to, alkyds, cellulosics (cellulose nitrate and cellulose esters), coumarone-indenes, epoxies, esters, hydrocarbons, melamines, natural resins, oleo resins, phenolics, polyamides, polyesters, rosins, silicones, terpenes, ureas, urethanes, vinyls, and the like.

The aqueous protective coating composition can further comprise a pigment, a coalescent, a solvent, a wetting agent, a defoamer, a matting agent, a dispersant, a thickener, a biocide, a mildewcide, and a surfactant. The aqueous protective coating composition may optionally contain other components such as those generally used in coatings. Typical components include, but are not limited to, fillers, flattening agents, plasticizers, stabilizers, viscosifiers, suspension agents, flow control agents, anti-skinning agents, extenders, film formation aids, cross-linkers, surface improvers, corrosion inhibitors, leveling aids, surface improvers, humectants/wet-edge agents (e.g., ethylene glycol, propylene glycol, and hexylene glycol), pH modifiers, and their combinations thereof.

Specific examples of the pigments can include, but are not limited to, carbazole dioxazine crude pigment; azo, monoazo, disazo, naphthol AS, and benzimidazolone condensation; metal complex; isoindolinone; isoindoline; polycyclic phthalocyanine; quinacridone; perylene; perinone; diketopyrrolo pyrrole; thioindigo; anthraquinone; indanthrone; anthrapyrimidine; flavanthrone; pyranthrone; anthanthrone; dioxazine; triarylcarbonium; quinophthalone pigments; diketo pyrrolo pyrrole red ("DPPBO red"); titanium dioxide; carbon black; barium sulfate; calcium silicate; zinc oxide; magnesium aluminum silicate; precipitated calcium carbonate; ground calcium carbonate; kaolin; talc; clay; barium sulfate; glass beads; calcium sulfate; barium sulfate; zinc sulfide; zinc carbonate; satin white; aluminum silicate; diatomaceous earth; magnesium silicate; synthetic amorphous silica; colloidal silica; colloidal alumina; fumed alumina, fumed silica; pseudo-boehmite; aluminum hydroxide, alumina; modified alumina; mica; lithopone; zeolite; hydrated halloysite; magnesium carbonate; magnesium hydroxide; lampblack; black iron oxide; nepeline syenite; red iron oxide; yellow iron oxide; brown iron oxide (a blend of red and yellow oxide with black); phthalocyanine green; phthalocyanine blue; organic reds (such as naphthol red, quinacridone red and toulidine red); quinacridone magenta, quinacridone violet; DNA orange; and/or organic yellows (such as Hansa yellow). Oftentimes, titanium dioxide grades used in the aqueous protective coating composition are surface modified with various inorganic oxides, such as silicates, aluminates, and zirconates.

The amount of the reaction product used in the aqueous protective coating composition of the present disclosure is the amount effective in providing the desired thickening and rheological properties to the coating composition. In one non-limiting embodiment, the reaction product can be used in a range of from about 0.05 to about 5 wt %, or from about 0.05 to about 4 wt %, or from about 0.05 to about 3 wt %, or from about 0.2 to about 4 wt %, or from about 0.2 to about 3 wt %, or from about 1 to about 4 wt % or from about 1 wt to about 3 wt %, or from about 1 to about 2 wt % of the total aqueous protective composition.

The following examples illustrate the present disclosure, parts and percentages being by weight, unless otherwise indicated. Each example is provided by way of explanation of the present disclosure, not limitation of the present disclosure. In fact, it will be apparent to those skilled in the art that various modifications and variations can be made in the present disclosure without departing from the scope or spirit of the invention. For instance, features illustrated or described as part of one embodiment, can be used on another embodiment to yield a still further embodiment. Thus, it is intended that the present disclosure covers such modifications and variations as come within the scope of the appended claims and their equivalents.

Polymer Preparation

In the examples, the following abbreviations are used:

BHT: Butylated hydroxytoluene

C8Br: 1-Bromooctane

C10Br: 1-Bromodecane

C12Br: 1-Bromododecane

C14Br: 1-Bromotetradecane

C16Br: 1-Bromohexadecane

C10OH: 1-Decanol

DBM: Dibromomethane

DBTDL: Dibutyltin dilaurate

HDI: Hexamethylene diisocyanate

MPEG: Methoxypolyethylene glycol with approximate $M_n$=2,460 and $M_w$=2,640, commercially available from Clariant.

$M_w$: Weight-average molecular weight $M_n$: Number-average molecular weight $M_z$: Z-average molecular weight PEG: Polyethylene glycol with approximate $M_n$ ranging from 8,270 to 8,510 and $M_w$ from approximately 8,600 to 8,800 Daltons.

TDA-40 Ethoxylate: Novel® TDA-410 Ethoxylate with approximate $M_n$=1,660 and $M_w$=1,810, commercially available from Sasol Chemicals LLC Hydrophobically-Modified Polyethylene Glycol Diluent Preparation Example 1—C8 PEG (Diluent 1)

A reactor was charged with 2700 g of PEG and 95.20 g of NaOH. The contents of the reactor were mixed for about 50 minutes under vacuum of 29 in. Hg while the temperature was increased to 91° C. The vacuum was turned off, 2.85 g of water was added, and the contents of the reactor were mixed for about 20 minutes. 231.00 g of C8Br was added over 40 minutes while the temperature was increased to about 120° C. The contents of the reactor were mixed for about 95 minutes while the temperature was maintained at 120° C. The contents of the reactor were mixed for about 30 minutes under 29 in. Hg while the temperature was maintained at about 120° C. Then the contents of the reactor were discharged and allowed to cool to 20-25° C. to give a solid C8 PEG.

Refer to Table 1 for analytical data of the Diluent 1.

Example 2—C10 PEG (Diluent 2)

A reactor was charged with 2700 g of PEG and 95.20 g of NaOH. The contents of the reactor were mixed for about 40 minutes under vacuum of 29 in. Hg while the temperature was increased to 90° C. The vacuum was turned off, 2.85 g of water was added, and the contents of the reactor were mixed for about 20 minutes. 252.00 g of C10Br was added over 30 minutes while the temperature was increased to about 120° C. The contents of the reactor were mixed for about 90 minutes while the temperature was maintained at 120° C. The contents of the reactor were mixed for about 30 minutes under 29 in. Hg while the temperature was maintained at about 119° C. Then the contents of the reactor were discharged and allowed to cool to 20-25° C. to give a solid C10 PEG.

Refer to Table 1 for analytical data of the Diluent 2.

Example 3—C12 PEG (Diluent 3)

A reactor was charged with 2700 g of PEG and 98.00 g of NaOH. The contents of the reactor were mixed for about 45 minutes under vacuum of 29 in. Hg while the temperature was increased to 90° C. The vacuum was turned off, 2.95 of water was added, and the contents of the reactor were mixed for about 1.5 minutes. 280.00 g of C12Br was added over 35 minutes while the temperature was increased to about 120° C. The contents of the reactor were mixed for about 60 minutes while the temperature was maintained at 120° C. The contents of the reactor were discharged and allowed to cool to 20-25° C. to give a solid C12 PEG.

Refer to Table 1 for analytical data of the Diluent 3.

Example 4—C12 PEG (Diluent 4)

A reactor was charged with 2700 g of PEG and 101.10 g of NaOH. The contents of the reactor were mixed for about 40 minutes under vacuum of 29 in. Hg while the temperature was increased to 91° C. The vacuum was turned off and the temperature was maintained at 90-91° C., 4.25 g of water was added, and the contents of the reactor were mixed for about 20 minutes. 289.00 g of C12Br was added over 30 minutes while the temperature was increased to about 120° C. The contents of the reactor were mixed for about 90 minutes while the temperature was maintained at about 120° C. The contents of the reactor were mixed for about 30 minutes under 29 in. Hg while the temperature was maintained at about 120° C. Then the contents of the reactor were discharged and allowed to cool to 20-25° C. to give a solid C12 PEG.

Refer to Table 1 for analytical data of the Diluent 4.

Example 5—C14 PEG (Diluent 5)

A reactor was charged with 2700 g of PEG and 101.10 g NaOH. The contents of the reactor were mixed for about 45 minutes under vacuum of 29 in. Hg while the temperature was increased to 91° C. The vacuum was turned off and the temperature was maintained at 90-91° C., 4.25 g of water was added, and the contents of the reactor were mixed for about 25 minutes. 337.58 g of C14Br was added over 30 minutes while the temperature was increased to about 111° C. The temperature was further increased to 120° C. The contents of the reactor were mixed for about 120 minutes while the temperature was maintained at about 120° C. The contents of the reactor were mixed for about 35 minutes under 29 in. Hg while the temperature was maintained at about 120° C. Then the contents of the reactor were discharged and allowed to cool to 20-25° C. to give a solid C14 PEG.

Refer to Table 1 for analytical data of the Diluent 5.

TABLE 1

Analytical Data for Hydrophobically-modified PEG Diluents

| Diluent Example | Description | Alkyl Halide Used for End-capping Diluent | SEC $M_n$ | SEC $M_w$ | SEC $M_z$ | Dispersity $M_n$/$M_w$ | HPLC Di-endcap (Normalized Area %) |
|---|---|---|---|---|---|---|---|
| Example 1 | C8 PEG | C8Br | 8,250 | 8,690 | 9,030 | 1.05 | 98.66 |
| Example 2 | C10 PEG | C10Br | 8,380 | 8,770 | 9,070 | 1.05 | 99.81 |
| Example 3 | C12 PEG | C12Br | 8,580 | 8,940 | 9,210 | 1.04 | 98.55 |
| Example 4 | C12 PEG | C12Br | 8,150 | 8,560 | 8,840 | 1.05 | 96.24 |
| Example 5 | C14 PEG | C14Br | 8,420 | 8,770 | 9,040 | 1.04 | 100.00 |

HmPAPE Control Polymer Preparation (No Diluents)

Example 6—C12 PAPE Control Polymer (C12 PAPE Polymer No Diluent)

A reactor was charged with 2700 g of PEG and 78.00 g of NaOH. The contents of the reactor were mixed for about 35 minutes wider vacuum of 29 in. Hg while the temperature was increased to 89° C. The vacuum was turned off and 4.02 g of water was added. The contents of the reactor were mixed at 89° C. for about 40 minutes. 40.25 g of DBM was added in one portion at 91° C. and then the temperature was increased to 100° C. From the beginning of the DBM addition, the contents of the reactor were mixed for 60 minutes. 148.00 g of C12Br was added in one portion at 98° C. The temperature was then increased to 120° C. From the beginning of the addition of C12Br, the contents of the reactor were mixed for a total time of 155 minutes. The contents of the reactor were mixed for about 35 minutes at 120-123° C. under 29 in. Hg. The contents of the reactor were discharged and allowed to cool to 20-25° C. to give a solid C12 PAPE.

Refer to Table 2 for analytical data of the C12 PAPE polymer with no Diluent.

Example 7—C16 PAPE Control Polymer (C16 PAPE Polymer No Diluent)

A reactor was charged with 2700 g of PEG and 78.00 g of NaOH. The contents of the reactor were mixed for about 30 minutes under vacuum of 29 in. Hg while the temperature was increased to 81° C. The vacuum was turned off and 4.02 g of water was added. The contents of the reactor were mixed at 81° C. for about 29 minutes. 40.25 g of DBM was added in one portion at 83° C. and the contents of the reactor were mixed for about 12 minutes. Then, the temperature was increased to about 93° C. The contents of the reactor were mixed as the temperature was further increased to 99-100° C. From the beginning of the addition of DBM, the contents of the reactor were mixed for a total time of 84 minutes. 181.00 g of C16Br was added in one portion at 94° C. The temperature was increased to 118-125° C. From the beginning of the addition of C16Br, the contents of the reactor were mixed for a total time of 178 minutes. The contents of the reactor were mixed at 118-120° C. for about 30 minutes under 29 in. Hg. The contents of the reactor were discharged and allowed to cool to 20-25° C. to give a solid C16PAPE.

Refer to Table 2 for analytical data of the C16 PAPE polymer with no Diluent.

TABLE 2

Analytical Data for HmPAPE Control Polymers Prepared without Diluents

| Polymer | Description | SEC $M_n$ | SEC $M_w$ | SEC $M_z$ | Dispersity index $M_n$/$M_w$ |
|---|---|---|---|---|---|
| Example 6 | C12 PAPE no Diluent | 26,400 | 45,700 | 67,700 | 1.73 |
| Example 7 | C16 PAPE no Diluent | 24,700 | 45,800 | 68,800 | 1.85 |

HmPAPE Polymer Preparation (With Diluents)

Example 8—C12 PEG C12 PAPE

A reactor was charged with 1134 g of PEG, 36.80 g of NaOH and 249.90 g of Diluent 4 obtained from Example 4. The contents of the reactor were mixed for about 35 minutes under vacuum of 29 in. Hg while the temperature was increased to 88° C. The vacuum was turned off and 1.65 g of water was added. The contents of the reactor were mixed at 89° C. for about 15 minutes. 22.3 g of DBM was added in one portion at 90° C. The contents of the reactor were mixed while the temperature was increased to 120° C. From the beginning of the addition of DBM, the contents of the reactor were mixed for a total time of 100 minutes. 67.94 g of C12Br was added in one portion at about 120° C. The contents of the reactor were mixed while heating to 129-132° C. From the beginning of the addition of C12Br, the contents of the reactor were mixed for a total time of 149 minutes. The contents of the reactor were mixed at 129-132° C. under 29 in. Hg for about 30 minutes. The contents of the reactor were discharged and allowed to cool to 20-25° C. to give a solid polymer.

Refer to Tables 3 and 4 for analytical data and aqueous solution data, respectively, of the polymer of Example 8.

Example 9—C12 PEG C12 PAPE

A reactor was charged with 675 g of PEG, 23.80 g of NaOH and 675 g of Diluent 3 obtained from Example 3. The contents of the reactor were mixed for about 45 minutes under vacuum of 29 in. Hg while the temperature was increased to 90-91° C. The vacuum was turned off and 1.04 g of water was added. The contents of the reactor were mixed at 90-91° C. for about 20 minutes. 13.50 g of DBM was added in one portion at 91° C. The contents of the reactor were mixed for about 60 minutes while the temperature was increased to 118° C. Additional DBM was added in four doses of 0.50 g each at 118-121° C. After each addition, the contents of the reactor were stirred for 30-35 minutes. 24.90 g of C12Br was added in one portion at 114° C. and the contents of the reactor were mixed while heating to 135-140° C. From the beginning of the addition of C12Br, the contents of the reactor were mixed for a total time of 115 minutes. The contents of the reactor were mixed at 136-140° C. under 29 in. Hg for about 30 minutes. The contents of the reactor were discharged and allowed to cool to 20-25° C. to give a solid polymer.

Refer to Tables 3 and 4 for analytical data and aqueous solution data, respectively, of the polymer of Example 9.

Example 10—C12 PEG C16 PAPE

A reactor was charged with 1134 g of PEG, 36.80 g of NaOH and 249.40 g of Diluent 4 obtained front Example 4. The contents of the reactor were mixed for about 35 minutes under vacuum of 29 in. Hg while the temperature was increased to about 89° C. The vacuum was turned off and 1.65 g of water was added. The contents of the reactor were mixed at about 89° C. for about 25 minutes. 20.50 g of DBM was added in one portion at about 89° C. The contents of the reactor were mixed while the temperature was adjusted to 102° C. From the beginning of the addition of DBM, the contents of the reactor were mixed for a total time of 90 minutes. 79.20 g of C16Br was added in one portion at 102° C. The contents of the reactor were mixed while heating to about 130° C. From the beginning of the addition of C16Br, the contents of the reactor were mixed for a total time of 160 minutes. The contents of the reactor were discharged and allowed to cool to 20-25° C. to give solid Polymer.

Refer to Tables 3 and 4 for analytical data and aqueous solution data, respectively, of the polymer of Example 10.

Example 11—C14 PEG C16 PAPE

A reactor was charged with 1134 g of PEG, 36.80 g of NaOH and 249.90 g of Diluent 5 obtained from Example 5. The contents of the reactor were mixed for about 30 minutes under vacuum of 29 in. Hg while the temperature was increased to 86° C. The vacuum was turned off and 1.65 g of water was added. The contents of the reactor were mixed at 87° C. for about 15 minutes. 20.31 g of DBM was added in one portion at 88° C. The contents of the reactor were mixed while the temperature was increased to about 120° C. From the beginning of the addition of DBM, the contents of the reactor were mixed for a total time of 95 minutes. 83.30 g of C16Br was added in one portion at about 120° C. The contents of the reactor were mixed while heating to 129-132° C. From the beginning of the addition of C16Br, the contents of the reactor were mixed for a total time of 127 minutes. The contents of the reactor were discharged and allowed to cool to 20-25° C. to give solid Polymer.

Refer to Tables 3 and 4 for analytical data and aqueous solution data, respectively, of the polymer of Example 11.

TABLE 3

Analytical Data for HmPAPE Polymers Made with Diluents

| Polymer | Description | SEC $M_n$ | SEC $M_w$ | SEC $M_z$ | Dispersity index $M_n/M_w$ |
|---|---|---|---|---|---|
| Example 8 | C12 PEG C12 PAPE | 20,700 | 42,300 | 69,300 | 2.04 |
| Example 9 | C12 PEG C12 PAPE | 15,400 | 43,500 | 88,300 | 2.83 |
| Example 10 | C12 PEG C16 PAPE | 22,100 | 48,500 | 78,800 | 2.20 |
| Example 11 | C14 PEG C16 PAPE | 21,600 | 48,500 | 79,900 | 2.25 |

TABLE 4

Information for Aqueous Solutions of Polymers Prepared with Diluents

| Polymer | Active Polymer Solid (%) | Methyl Beta Cyclodextrin (%) | Vantocil (%) | Biosperse CN7539 (%) | Advantage 1512 (%) | SAG 47 (%) | Spindle Code | Viscosity (cP) |
|---|---|---|---|---|---|---|---|---|
| Example 8 | 20.00 | 0.00 | 0.10 | 0.02 | 0.00 | 0.04 | S64 | 5,040 |
| Example 9 | 20.00 | 0.00 | 0.10 | 0.02 | 0.00 | 0.04 | S64 | 7,340 |
| Example 10 | 20.00 | 1.70 | 0.15 | 0.04 | 0.04 | 0.00 | S64 | 3,240 |
| Example 11 | 20.00 | 1.70 | 0.15 | 0.04 | 0.04 | 0.00 | S64 | 6,700 |

Preparation of Diluents Derived from Diisocyanates and Hydrophobic Alkoxylates

Example 12—HDI MPEG Diluent

A reactor was charged with 1085.00 g of MPEG. The contents of the reactor were stirred under vacuum of 29 in. Hg while the temperature was increased to about 115° C. Once the temperature reached to 115° C., the contents of the reactor were stirred for about 60 minutes. The vacuum was then turned off and the temperature was adjusted to 85° C. 31.65 g of HDI was added at 85° C. and the contents of the reactor were mixed for about 5 minutes. 1.28 g of DBTDL was added at 87° C. The contents of the reactor were mixed for about 45 minutes at 84-87° C. The contents of the reactor were discharged and allowed to cool to 20-25° C. to give a solid Diluent polymer.

Refer to Tables 5 and 6 for analytical data and aqueous solution data, respectively, of Example 12.

Example 13—HDI TDA-40 Ethoxylate Diluent

A reactor was charged with 1029.36 g of TDA-40 Ethoxylate. The contents of the reactor were stirred under vacuum of 29 in. Hg while the temperature was increased to about 115° C. Once the temperature reached to 115° C., the contents of the reactor were stirred for about 60 minutes. The vacuum as then turned off and the temperature was adjusted to 80° C. 46.79 g of HDI was added at 80° C. and the contents of the reactor were mixed for about 8 minutes. The temperature of the contents of the reactor increased to about 90° C. 4.74 g of DBTDL was added at 90° C. The contents of the reactor were mixed at 80-91° C. for 45 minutes. The contents of the reactor were discharged and allowed to cool to about 20-25° C. to give a solid Diluent polymer.

Refer to Tables 5 and 6 for analytical data and aqueous solution data, respectively, of Example 13.

TABLE 5

Analytical Data for Hydrophobically-modified PEG Diluents and Diluents Derived from Diisocyanates and Hydrophobic Alkoxylates

| Polymer | Diisocyanate Used | Hydrophobically-modified PEG or Ethoxylate Description | Polymer SEC $M_n$ | Polymer SEC $M_w$ | Polymer SEC $M_z$ | Dispersity Index $M_n/M_w$ | HPLC Hydrophobic Alkoxylate Diisocyanate Diluent (Normalized Area %) |
|---|---|---|---|---|---|---|---|
| Example 12 | HDI | MPEG | 5,200 | 5,540 | 5,850 | 1.07 | 99.92 |
| Example 13 | HDI | TDA-40 Ethoxylate | 3,260 | 3,490 | 3,720 | 1.07 | 100.00 |

TABLE 6

Information for Aqueous-Solutions of Diluents

| Polymer | Active Polymer Solids (%) | Vantocil (%) | Bio-sperse CN7539 (%) | Advan-tage (%) | SAG 47 (%) | Spindle Code | Vis-cosity (cP) |
|---|---|---|---|---|---|---|---|
| Example 12 | 20.00 | 0.10 | 0.02 | 0.00 | 0.04 | S61 | 12 |
| Example 13 | 20.00 | 0.10 | 0.02 | 0.00 | 0.04 | S64 | 3,460 |

HEUR Control Polymer Preparation (No Diluent)

Example 14—HEUR Control Polymer (HEUR Polymer No Diluent)

A reactor was charged with 1500 g of PEG. The contents of the reactor were stirred under vacuum of 29 in. Hg while the temperature was increased to about 125° C. The temperature was subsequently reduced to 110° C. The time period from the time PEG was charged to the end of the hold at 110° C. lasted about 75 minutes. The temperature was then reduced to 80-82° C. 0.16 g of BHT was added at 80° C. and the contents of the reactor were mixed for about 5 minutes. 26.29 g of C10 OH was added at 82° C. and the contents of the reactor were mixed for about 5 minutes. 45.50 g of HDI was added at 83° C. and the contents of the reactor were mixed for about 5 minutes. The temperature of the contents of the reactor increased to about 94° C. 3.75 g of bismuth octoate catalyst was added at 94° C. The contents of the reactor were mixed for about 21 minutes as the temperature was increased to 101-104° C. The contents of the reactor were discharged and allowed to cool to 20-25° C. to give a solid polymer.

Refer to Table 7 for analytical data of the HEUR polymer with no Diluent.

TABLE 7

Analytical Data for HEUR Control Polymers Prepared without Diluents

| Polymer | Description | SEC $M_n$ | SEC $M_w$ | SEC $M_z$ | Dispersity index $M_n/M_w$ |
|---|---|---|---|---|---|
| Example 14 | C10 HDI HEUR no Diluent | 23,300 | 38,900 | 57,700 | 1.67 |

Preparation of HEUR Polymers with Diluents Derived from Diisocyanates and Hydrophobic Alkoxylates

HEUR Polymer

Example 15—HDI MPEG C10 HDI HEUR

A reactor was charged with 1010 g of PEG and 190.00 g of HDI MPEG Diluent obtained from Example 12. The contents of the reactor were mixed under vacuum of 29 in. Hg while the temperature was increased to 110° C. The temperature was increased further to 125° C. and maintained at 125° C. The time period from the time the temperature reached 110° C. to the end of the hold at 125° C. lasted about 62 minutes. The temperature was reduced to 85° C. 0.11 g of BHT was added at 85° C. and the contents of the reactor were mixed for about 5 minutes. 13.86 g of C10 OH was added at 84° C. and the contents of the reactor were mixed for about 9 minutes. 28.74 g of HDI was added at 85° C. and the contents of the reactor were mixed for about 6 minutes. The temperature of the contents of the reactor increased to about 89° C. 2.52 g of bismuth octoate catalyst was added at 89° C. The contents of the reactor were mixed for about 60 minutes as the temperature increased to 95-97° C. The contents of the reactor were discharged and allowed to cool to 20-25° C. to give a solid polymer.

Refer to Tables 8 and 9 for analytical data and aqueous solution data, respectively, of Example 15.

Example 16—HDI TDA-40 Ethoxylate C10 HDI HEUR

A reactor was charged with 1010 g of PEG and 190.00 g of HDI TDA-40 Ethoxylate Diluent obtained from Example 13. The contents of the reactor were mixed under vacuum of 29 in. Hg while the temperature was increased to about 110° C. The temperature was increased further to 125° C., and maintained at about 125° C. The time period from the time the temperature reached 110° C. to the end of the hold at 125° C. lasted about 45 minutes. The temperature was reduced to 85° C. 0.11 g of BHT was added at 85° C. and the contents of the reactor were mixed for about 5 minutes. 12.82 g of C10 OH was added at 86° C. and the contents of the reactor were mixed for about 10 minutes. 28.20 g of HDI was added at 85° C. and the contents of the reactor were mixed for about 5 minutes. The temperature of the contents of the reactor increased to about 100° C. 2.52 g of bismuth octoate catalyst was added at 100° C. The contents of the reactor were mixed for about 60 minutes as the temperature increased to 111° C. The contents of the reactor were discharged and allowed to cool to 20-25° C. to give a solid polymer.

Refer to Tables 8 and 9 for analytical data and aqueous solution data, respectively, of Example 16.

TABLE 8

Analytical Data for HEUR Polymers Made with Diluents

| Polymer | Description | SEC $M_n$ | SEC $M_w$ | SEC $M_z$ | Dispersity index $M_n/M_w$ |
|---|---|---|---|---|---|
| Example 15 | HDI MPEG C10 HDI HEUR | 16,400 | 39,700 | 66,900 | 2.42 |
| Example 16 | HDI TDA-40 Ethoxylate C10 HDI HEUR | 12,900 | 40,200 | 68,300 | 3.12 |

TABLE 9

Information for Aqueous Solutions of Polymers Prepared with Diluents

| Polymer | Active Polymer Solid (%) | Vantocil (%) | Bio-sperse CN7539 (%) | Advan-tage 1512 (%) | SAG 47 (%) | Spindle Code | Vis-cosity (cP) |
|---|---|---|---|---|---|---|---|
| Example 15 | 20.00 | 0.10 | 0.02 | 0.00 | 0.04 | S63 | 2,304 |
| Example 16 | 20.00 | 0.10 | 0.02 | 0.00 | 0.04 | S64 | 3,560 |

Characterization of Hydrophobically-Modified PEG Diluents

The C8 PEG, C10 PEG, C12 PEG, and C14 PEG Diluents were characterized by SEC and HPLC.

Characterization of Diluents Derived from Diisocyanates and Hydrophobic Alkoxylates The HDI MPEG Diluent and the HDI IDA-40 Ethoxylate Diluent were characterized by SEC and HPLC.

Characterization of HmPAPE Control Polymers Made Without Diluents

The C12 PAPE and C16 PAPE control polymers were characterized by SEC and HPLC.

Characterization of C10 HDI HEUR Control Polymer Made without Diluents

The C10 HDI HEUR control polymer was characterized by SEC.

Characterization of HmPAPE and HEUR Polymers Made with Diluents

The HmPAPE and HEUR polymers made with Diluents were characterized by SEC.

SEC Measurement

SEC was used for measuring polymer molecular weight distributions. Waters HPLC System and Empower™ Chromatography Data System, commercially available from the Waters Corporation (Milford, MA) were used to measure the molecular weights. As used herein with respect to polymers, the terms molecular weight, average molecular weight, mean molecular weight, and apparent molecular weight refer to the arithmetic mean of the molecular weight of individual macromolecules as measured by SEC. The relative molecular weight averages from the SEC were calculated versus poly(ethylene glycol/ethylene oxide) (PEG/PEO) standards with narrow molecular weight distribution.

Apparatus Set-up—All Waters modules the set tip included:

Waters M515 solvent delivery system

Waters M2707 autosampler

Waters M2414 differential refractive index detector (DRI) for the relative SEC

Column bank(s)—see the details in the “Analysis Conditions” section below

Waters Empower™ 3 software

RI range 1.00 to 1.75 RIU

Measurement range $7\times10^7$ RIU

Drift—$2\times10^7$ RIU

Analysis Conditions for SEC was described as follows:

Mobile Phase—70% Methanol/30% 0.6M Lithium acetate (pH 4.8) (w/w)

Flow Rate—1.0 ml/mi

Columns—1 Shodex KW-804 Protein columns (8 mm×300 mm)+1 Shodex KW-803 Protein columns (8 mm×300 mm) in series (Shown Denko America, Inc., 420 Lexington Avenue, Suite 2335A, New York, NY 10170, USA)

Column Temperature 40° C.

DRI (differential refractive index) Detector Temperature 40° C.

Calibration—PEO/PEG standards with narrow molecular weight distribution (PSS-USA, Inc, Amherst Fields Research Park, 160 Old Farm Road, Amherst, MA 01002)

Sample Concentration—Typically 1.5 mg/ml (unless otherwise noted)—dissolved directly into mobile phase Injection volume—100 µl HPLC Measurement HPLC was used for determining the degree of hydrophobic di-endcapping. An Agilent 1200 Series Quaternary LC System and OpenLAB Chromatography Data System, commercially available from Agilent Technologies (Santa Clara, CA), were used under reversed-phase conditions with a water/acetonitrile gradient and evaporative light scattering detection (ELSD).

Reagents:

1. Deionized water, high purity—18 mega ohm from laboratory water purification system.
2. Burdick & Jackson HPLC Grade Acetonitrile, available from Honeywell Burdick & Jackson, 101 Columbia Road, Morristown, NJ 07962, Cat. No. 015-4.
3. Phosphoric Acid, 85%, ACS Reagent grade ($H_3PO_4$, CAS 7664-38-2)—www.sigmaaldrich.com, Cat. No. 466123 or equivalent.
4. Burdick & Jackson HPLC Grade Methanol, available from Honeywell Burdick & Jackson, 101 Columbia Road, Morristown, NJ 07962, Cat. No. 230-4.

Sample Preparation:

Polymer samples were prepared by weighing ~100 mg of polymer sample, HPLC methanol (nominally 10 mL) and 2 drops of concentrated phosphoric acid were added. The samples were vortexed and/or gently heated (~50° C.) until in solution.

Apparatus Set-up—All Agilent modules in the set-up included:

Agilent G1322A 1200 Series Vacuum Degasser
Agilent G1311A 1200 Series Quaternary Pump
Agilent G1329A 1200 Series Standard Autosampler
Agilent G1316A 1200 Series Thermostatted Column Compartment
Agilent G7102A 1290 Infinity II ELSD
Agilent OpenLAB Chromatography Data System Analysis Conditions for HPLC was described as follows:

Mobile Phase—Water/acetonitrile gradient
Flow Rate—0.5 ml/min
Column—4.0×50 mm, 3 micron YMC-Pack Ph, Part No. PH12S03-0504WT (YMC America, Allentown, PA)
Column Temperature—40° C.
Sample Concentration—Typically 10 mg/ml—dissolved in acidified methanol
Injection volume—10 μl Di-endcapped regions are determined using known PEG and polymers driven to full di-endcapping. Di-endcapping is reported as normalized area percent.

Coating Applications

A base paint was prepared by mixing a grind formulation in Table 10A and letdown formulation in Table 10B, respectively.

TABLE 10A

Grind Formulation

| Generic Name/Trade Name | Amount Lbs | Amount Gal |
|---|---|---|
| Water | 151.20 | 18.15 |
| Nuosept ™ 498G | 0.21 | 0.13 |
| Ammonium Hydroxide (28%) | 1.50 | 0.17 |
| Tamol ™ 731A | 8.00 | 0.87 |
| Dextrol ™ OC-180 HS | 2.00 | 0.22 |
| Drewplus ™ T-4304 | 3.00 | 0.38 |
| Strodex ™ PK-95G | 2.00 | 0.22 |
| Ti-Pure ™ R-706 | 250.00 | 7.51 |

TABLE 10A-continued

Grind Formulation

| Generic Name/Trade Name | Amount Lbs | Amount Gal |
|---|---|---|
| Minex ® 7 | 15.00 | 0.69 |
| Min-U-gel ® 400 | 1.75 | 0.06 |

Nuosept ™ 498G: 1,2-benzisothiazolin-3-one, commercially available from Ashland Inc.
Tamol ™ 731A: Sodium salt of a maleic anhydride copolymer, commercially available from The Dow Chemical Company.
Dextrol ™ OC-180 HS: Neutralized (potassium salt) form of an ethoxylated aliphatic alcohol phosphate ester, commercially available from Ashland Inc.
Drewplus ™ T-4304: A defoamer, commercially available from Ashland Inc.
Strodex ™ PK-95G: Neutralized (potassium salt) form of a phosphate coester of aliphatic alcohols, commercially available from Ashland Inc.
Ti-Pure ™ R-706: Titanium dioxide, commercially available from Chemours Titanium Technologies.
Minex ® 7: Micronized functional filler having a median particle size of 3.5 microns, commercially available from The Cary Company.
Min-U-gel ® 400: A hydrous magnesium aluminum silicate, commercially available from Active Minerals International, LLC.

TABLE 10B

Letdown Formulation

| Generic Name/Trade Name | Amount Lbs | Amount Gal |
|---|---|---|
| Rhoplex ™ VSR-1050 | 500.00 | 56.56 |
| Optifilm ™ Enhancer 400 | 8.00 | 0.99 |
| Drewplus ™ T-4304 | 2.00 | 0.25 |
| Polyphase ® 678 | 3.00 | 0.31 |

Rhoplex ™ VSR-1050: Acrylic emulsion, commerically available from The Dow Chemical Company.
Optifilm ™ Enhancer 400: a coalescent, commerically available from Eastman Chemical Company.
Polyphase ® 678: a fungicide, commercially available from Troy Corporation.

Thickening Efficiency Measurement

Thickening efficiency was measured by adding 2.0 g of the 20 wt % of the solutions of polymer samples obtained from the Examples into 72.0 g of the base paint obtained by mixing the formulations listed in Tables 10A and 10B. The thickening efficiency was measured bye Brookfield Viscosity, Stormer Viscosity (KU), ICI Viscosity of thickened paints as described below. The results are listed in Table 11.

Brookfield Viscosity was measured using a Brookfield viscometer with spindle #5 at 30 RPM and 25° C. It is expressed in mPa·s.

Stormer Viscosity was measured using a Stormer viscometer as per the standard test method ASTM D562. It is expressed in Kreb Units (KU).

ICI Viscosity was measured using an ICI cone and plate viscometer as per the standard test method ASTM D4287. It is expressed in mPa·s.

TABLE 11

Brookfiled Viscosity, KU Viscosity of Thickened Paints

| Sample | Weight Ratio of Diluent to PEG | Brookfield Viscosity (mPa · s) | KU | ICI (mPa · s) |
|---|---|---|---|---|
| Example 4 | — | Off-scale | 121 | 131 |
| Example 5 | — | Off-scale | 169 | * |
| Example 6 | — | 947 | 72 | 139 |
| Example 7 | — | Off-scale | Off-scale* | 132 |
| Example 8 | 4.5:1 | 868 | 75 | 150 |
| Example 9 | 1:1 | 2693 | 94 | 132 |
| Example 10 | 4.5:1 | Off-scale | 166 | 132 |
| Example 11 | 4.5:1 | Off-scale | Off-scale* | 115 |

TABLE 11-continued

Brookfiled Viscosity, KU Viscosity of Thickened Paints

| Sample | Weight Ratio of Diluent to PEG | Brookfield Viscosity (mPa · s) | KU | ICI (mPa · s) |
|---|---|---|---|---|
| Example 12 | — | * | 34 | 23.8 |
| Example 13 | — | Off-scale | 163 | 96.9 |
| Example 14 | — | 1493 | 98 | 147.5 |
| Example 15 | 5:3:1 | 1293 | 82 | 117.5 |
| Example 16 | 5:3:1 | 1133 | 76 | 126.5 |

*too low to be reported

Paint data—Refer to Table 12 for thickening efficiency data for the C8 PEG, C10 PEG, C12 PEG, and C14 Diluents.

TABLE 12

Thickening Efficiency for C8 PEG, C10 PEG, C12 PEG, and C14 PEG Diluents

| Diluent Example | Diluent Description | Brookfield Viscosity (mPa · s) | KU | ICI (mPa · s) |
|---|---|---|---|---|
| Example 1 | C8 PEG | 13 | 30 | 27.7 |
| Example 2 | C10 PEG | 6,933 | 93 | 80 |
| Example 4 | C12 PEG | Off-scale | 121 | 131 |
| Example 5 | C14 PEG | Off-scale | 169 | Off-scale |

*too low to be reported

PEG Diluents were also derived from reaction of hydrophobic alkoxylates with diisocyanates. As shown in Table 5, in one example, MPEG was used as a hydrophobic alkoxylate. In another case example TDA-40 ethoxylate was used as the hydrophobic alkoxylate.

Refer to Table 13 for thickening efficiency data for the HDI MPEG Diluent and HDI TDA-40 ethoxylate Diluent.

TABLE 13

Thickening Efficiency for HDI MPEG Diluent and HDI TDA-40 Ethoxylate Diluent

| Diluent Example | Diluent Description | Brookfield Viscosity (mPa · s) | KU | ICI (mPa · s) |
|---|---|---|---|---|
| Example 12 | HDI MPEG | Off-scale | 34 | 23.8 |
| Example 13 | HDI TDA-40 Ethoxylate | Off-scale | 163 | 96.9 |

*too low to be reported

Several C12 PEG C12 PAPE polymers were made by synthesizing C12 PAPE polymers in the presence of the C12 PEG Diluents of Examples 3 and 4.

TABLE 14

Thickening Efficiency of C12 PEG Diluent and C12 PEG C12 PAPE Polymers

| | | Ratio of Diluent to PEG in Recipe (g) | | Brookfield | | |
|---|---|---|---|---|---|---|
| Polymer Example | Polymer Description | PEG (g) | Diluent (g) | Viscosity (mPa · s) | KU | ICI (mPa · s) |
| Example 4 | C12 PEG Diluent | — | — | Off-scale | 121 | 131 |
| Example 6 | C12 PAPE made without Diluent | — | — | 947 | 72 | 139 |
| Example 8 | C12 PEG C12 PAPE | 1,134.00 | 249.90 | 868 | 75 | 150 |
| Example 9 | C12 PEG C12 PAPE | 675.00 | 675.00 | 2693 | 94 | 132 |

TABLE 15

Thickening Efficiency of Hydrophobically-modified PEG Diluents, C16 PAPE Control Polymer, and Hydrophobically-modified PEG C16 PAPE Polymers

| | | Ratio of Diluent to PEG in Recipe (g) | | Brookfield | | |
|---|---|---|---|---|---|---|
| Polymer Example | Polymer Description | PEG (g) | Diluent (g) | Viscosity (mPa · s) | KU | ICI (mPa · s) |
| Example 4 | C12 PEG Diluent | — | — | Off-scale | 121 | 131.0 |
| Example 5 | C14 PEG Diluent | — | — | Off-scale | 169 | * |
| Example 7 | C16 PAPE made without Diluent | — | — | Off-scale | Off-scale | 132 |
| Example 10 | C12 PEG C16 PAPE | 1,134.00 | 249.90 | Off-scale | 166 | 132 |
| Example 11 | C14 PEG C16 PAPE | 1,134.00 | 249.90 | Off-scale | Off-scale | 115 |

* too low to be reported

An HDI MPEG C10 HDI HEUR polymer was made by synthesizing a C10 HDI HEUR polymer in the presence of an HDI MPEG Diluent.

An HDI TDA-40 ethoxylate C10 HDI HEUR polymer was made by synthesizing a C10 HDI HEUR polymer in the presence of an HDI TDA-40 ethoxylate Diluent.

TABLE 16

Thickening Efficiency of HDI Alkyl Diluents, C10 HDI HEUR Control Polymer, and HDI Alkyl C10 HDI HEUR Polymers

| Polymer Example | Polymer | Ratio of Diluent to PEG in Recipe (g) PEG (g) | Diluent (g) | Brookfield Viscosity (mPa · s) | KU | ICI (mPa · s) |
|---|---|---|---|---|---|---|
| Example 12 | HDI MPEG Diluent | — | — | * | 34 | 23.8 |
| Example 13 | HDI TDA-40 Ethoxylate Diluent | — | — | Off-scale | 163 | 96.9 |
| Example 14 | C10 HDI HEUR | — | — | 1493 | 84 | 147.5 |
| Example 15 | HDI MPEG C10 HDI HEUR | 1,010.00 | 190.00 | 1293 | 82 | 117.5 |
| Example 16 | HDI TDA-40 Ethoxylate C10 HDI HEUR | 1,010.00 | 190.00 | 1133 | 76 | 126.5 |

* too low to be reported

What is claimed is:

1. A method for preparing a reaction product, comprising:

(1) molten mixing a first active hydrogen containing component and a first alkali hydroxide to form a first mixture;

(2) adding water into the first mixture to dissolve the first molten alkali hydroxide to form a second mixture;

(3) reacting a first hydrophobic component with the second mixture to provide a Diluent;

(4) molten mixing at least one second active hydrogen containing component, a second alkali hydroxide and the Diluent to form a third mixture;

(5) adding water into the third mixture to dissolve the second molten alkali hydroxide to form a fourth mixture; and (6) reacting the fourth mixture with a gem-polyhalide compound or a sulfonate ester for a sufficient time to form the reaction product.

2. The method of claim 1, further comprising a step (7) reacting a second hydrophobic component with the reaction product.

3. The method of claim 1, wherein the first and second active hydrogen containing components are identical or different and each independently comprises a single functional group of OH, SH, or $NH_2$.

4. The method of claim 3, wherein the first and second active hydrogen containing components can each independently be represented by Formula (I), D-X Formula (I)

where X is OH, SH or $NH_2$ and D is a substituted or unsubstituted, and/or alkoxylated or non-alkoxylated alkylene, alkyne, alkenyl, alkynyl, aryl, alkylaryl, arylalkylene, aryl alkyne, arylalkenyl, arylalkynyl, cyclic, cycloaliphatic, or polycyclic moiety.

5. The method of claim 1, wherein the first and second active hydrogen containing components are identical or different and each independently comprises at least two functional groups of OH, SH, or $NH_2$.

6. The method of claim 5, wherein the first and second functional active hydrogen containing components can each independently be represented by Formula (II), (III) or (IV), X—D—X Formula (II)

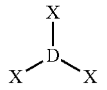

Formula (III)

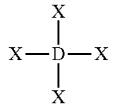

Formula (IV)

where X is OH, SH, or $NH_2$ and D is a substituted or unsubstituted, and/or alkoxylated or non-alkoxylated alkylene, alkyne, alkenyl, alkynyl, aryl, alkylaryl, arylalkylene, aryl alkyne, arylalkenyl, arylalkynyl, cyclic, cycloaliphatic, or polycyclic moiety.

7. The method of claim 6, wherein the first and second active hydrogen containing components can each independently be represented by Formula (V),

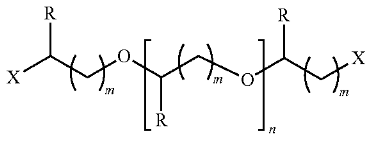

Formula (V)

where X is OH, SH, or $NH_2$, R is H or alkyl, n is an integer of 0 to 500 and m is an integer of 1 to 3.

8. The method of claim 5, wherein the first and second active hydrogen containing components are identical or different and each independently comprises a dihydric alcohol, a polyol or a polyetheramine.

9. The method of claim 1, wherein the first hydrophobic component is a sulfonate ester or represented by Formula (VI), Z-G Formula (VI)

where Z is Br, Cl, I, or F; and G is a substituted or unsubstituted, and/or alkoxylated or non-alkoxylated alkylene, alkyne, alkenyl, alkynyl, aryl, alkylaryl, arylalkylene, aryl alkyne, arylalkenyl, arylalkynyl, cyclic, cycloaliphatic, or polycyclic moiety.

10. The method of claim 2, wherein the second hydrophobic component is a sulfonate ester or represented by Z-G or

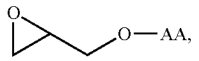

where Z is Br, Cl, I, or F; G is a substituted or unsubstituted, and/or alkoxylated or non-alkoxylated alkylene, alkyne, alkenyl, alkynyl, aryl, alkylaryl, arylalkylene, aryl alkyne, arylalkenyl, arylalkynyl, cyclic, cycloaliphatic, or polycyclic moiety; and AA is a substituted or unsubstituted, and/or alkoxylated or non-alkoxylated alkylene, alkyne, alkenyl, alkynyl, aryl, alkylaryl, arylalkylene, aryl alkyne, arylalkenyl, arylalkynyl, cyclic, cycloaliphatic, or polycyclic moiety.

11. The method of claim 2, wherein the first and second hydrophobic components are identical or different and can each independently be a sulfonate ester or represented by Formula (VII), (VIII) or (IX), Formula (VII)

Z—G—Z

Formula (VIII)

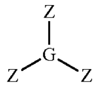

Formula (IX)

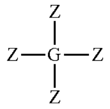

where Z is Br, Cl, I, or F; and G is a substituted or unsubstituted, and/or alkoxylated or non-alkoxylated alkylene, alkyne, alkenyl, alkynyl, aryl, alkylaryl, arylalkylene, aryl alkyne, arylalkenyl, arylalkynyl, cyclic, cycloaliphatic, or polycyclic moiety.

12. The method of claim 1, wherein the sulfonate ester is selected from the group consisting of methane sulfonate, ethyl methane sulfonate, methyl trifluoromethanesulfonate, bromomethyl tosylate, chloromethyl tosylate, and methylene bis(toluene-4-sulfonate).

13. A method for preparing a reaction product, comprising:

(1) molten mixing a first polyglycidyl ether component and a first alkali hydroxide to form a first mixture;

(2) adding water into the first mixture to dissolve the first molten alkali hydroxide to form a second mixture;

(3) reacting a first active hydrogen containing component comprising a functional group of OH, SH, or $NH_2$ with the second mixture to form a third mixture; and (4) reacting a first hydrophobic component represented by Z-G (where Z is Br, Cl, I, F, O, or sulfonate ester and G is a substituted or unsubstituted, and/or alkoxylated or non-alkoxylated alkylene, alkyne, alkenyl, alkynyl, aryl, alkylaryl, arylalkylene, aryl alkyne, arylalkenyl, arylalkynyl, cyclic, cycloaliphatic, or polycyclic moiety(ies)) with the third mixture to provide a Diluent.

14. The method of claim 13, further comprising one or more steps of:

(5) molten mixing a second active hydrogen component, a second alkali hydroxide, and the Diluent to form a fourth mixture, wherein the second active hydrogen component can be represented by Formula (I), (II), (III), or (IV);

Formula (I)

D—X

Formula (II)

X—D—X

Formula (III)

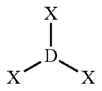

Formula (IV)

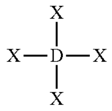

where X is OH, SH, or $NH_2$ and D is substituted or unsubstituted, and/or alkoxylated or non-alkoxylated alkylene, alkyne, alkenyl, alkynyl, aryl, alkylaryl, arylalkylene, aryl alkyne, arylalkenyl, arylalkynyl, cyclic, cycloaliphatic, or polycyclic moiety;

(6) adding water into the fourth mixture to dissolve the second molten alkali hydroxide to form a fifth mixture; and/or (7) reacting the fifth mixture with a gem-polyhalide compound or a sulfonate ester for a sufficient time to form a reaction product.

15. The method of claim 14, further comprising a step (8) reacting a second hydrophobic component with the reaction product, wherein the second hydrophobic component is a sulfonate ester or represented by Z-G, or

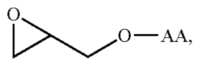

where Z is Br, Cl, I, or F; G is a substituted or unsubstituted, and/or alkoxylated or non-alkoxylated alkylene, alkyne, alkenyl, alkynyl, aryl, alkylaryl, arylalkylene, aryl alkyne, arylalkenyl, arylalkynyl, cyclic, cycloaliphatic, or polycyclic moiety; and AA is a substituted or unsubstituted, and/or alkoxylated or non-alkoxylated alkylene, alkyne, alkenyl, alkynyl, aryl, alkylaryl, arylalkylene, aryl alkyne, arylalkenyl, arylalkynyl, cyclic, cycloaliphatic, or polycyclic moiety.

16. The method of claim 13, further comprising one or more steps of:

(5) molten mixing a second active hydrogen component, a second alkali hydroxide, a second polyglycidyl ether, and the Diluent to form a fourth mixture, wherein the second active hydrogen component is represented by Formula (I), (II), (III) or (IV):

Formula (I)

D—X

Formula (II)

X—D—X

-continued

Formula (III)

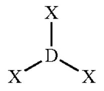

Formula (IV)

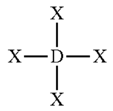

where X is OH, SH, or $NH_2$ and D is substituted or unsubstituted, and/or alkoxylated or non-alkoxylated alkylene, alkyne, alkenyl, alkynyl, aryl, alkylaryl, arylalkylene, aryl alkyne, arylalkenyl, arylalkynyl, cyclic, cycloaliphatic, or polycyclic moiety;

(6) adding water into the fourth fifth mixture to dissolve the second molten alkali hydroxide to form a fourth mixture; and/or (7) reacting the fifth mixture to form the reaction product.

17. The method of claim 16, further comprising a step (8) reacting a second hydrophobic component with the reaction product, wherein the second hydrophobic component is represented by a sulfonate ester, Z-G, or

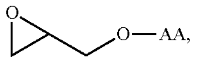

where Z is Br, Cl, I, or F; G is a substituted or unsubstituted, and/or alkoxylated or non-alkoxylated alkylene, alkyne, alkenyl, alkynyl, aryl, alkylaryl, arylalkylene, aryl alkyne, arylalkenyl, arylalkynyl, cyclic, cycloaliphatic, or polycyclic moiety; and AA is a substituted or unsubstituted, and/or alkoxylated or non-alkoxylated alkylene, alkyne, alkenyl, alkynyl, aryl, alkylaryl, arylalkylene, aryl alkyne, arylalkenyl, arylalkynyl, cyclic, cycloaliphatic, or polycyclic moiety.

18. The method of claim 16, wherein the first and second polyglycidyl ether components are identical or different and each is independently represented by Formula (X), (XI), (XII), or (XIII), Formula (X)

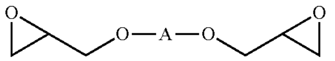

Formula (XI)

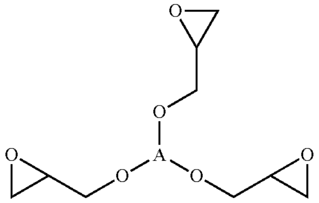

Formula (XII)

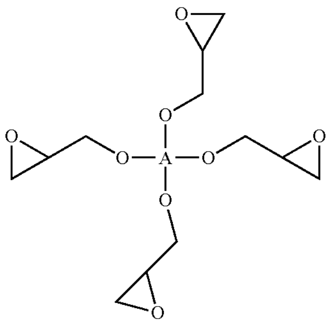

Formula (XIII)

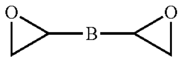

where A is a substituted or unsubstituted, and/or alkoxylated or non-alkoxylated alkylene, alkyne, alkenyl, alkynyl, aryl, alkylaryl, arylalkylene, aryl alkyne, arylalkenyl, arylalkynyl, cyclic, cycloaliphatic, or polycyclic moiety; and B is $CH_2OCH_2$.

* * * * *